US009281704B2

(12) United States Patent
Heo et al.

(10) Patent No.: US 9,281,704 B2
(45) Date of Patent: Mar. 8, 2016

(54) METHOD OF CONTROLLING A LOAD CURRENT, LOAD CURRENT CONTROL DEVICE, AND MOBILE DEVICE HAVING THE SAME

(71) Applicants: Dong-Hun Heo, Seoul (KR); Sang-Hyun Cho, Asan-si (KR); Hyung-Jong Ko, Seongnam-si (KR)

(72) Inventors: Dong-Hun Heo, Seoul (KR); Sang-Hyun Cho, Asan-si (KR); Hyung-Jong Ko, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 270 days.

(21) Appl. No.: 13/959,043

(22) Filed: Aug. 5, 2013

(65) Prior Publication Data
US 2014/0047248 A1    Feb. 13, 2014

(30) Foreign Application Priority Data
Aug. 9, 2012    (KR) .................. 10-2012-0087074

(51) Int. Cl.
*G06F 1/32*    (2006.01)
*H02J 7/00*    (2006.01)
*G06F 1/26*    (2006.01)

(52) U.S. Cl.
CPC ............. *H02J 7/0068* (2013.01); *G06F 1/26* (2013.01); *H02J 7/0063* (2013.01); *H02J 2007/0067* (2013.01)

(58) Field of Classification Search
None
See application file for complete search history.

(56) References Cited

U.S. PATENT DOCUMENTS

| | | | |
|---|---|---|---|
| 6,400,195 B1 * | 6/2002 | Bhaskaran | 327/142 |
| 6,643,786 B1 * | 11/2003 | Kawakami | 713/340 |
| 6,697,953 B1 * | 2/2004 | Collins | 713/320 |
| 6,768,370 B2 | 7/2004 | Takahashi et al. | |
| 7,697,704 B2 | 4/2010 | Brooks et al. | |
| 7,782,018 B2 | 8/2010 | Voigt | |
| 2006/0050910 A1 | 3/2006 | Danielsen | |
| 2006/0269082 A1 | 11/2006 | Danielsen et al. | |

\* cited by examiner

*Primary Examiner* — Paul Yanchus, III
(74) *Attorney, Agent, or Firm* — Harness, Dickey & Pierce, P.L.C.

(57) ABSTRACT

A method of controlling a load current is provided. By the method, a battery voltage control operation is begun when a battery voltage becomes lower than a first threshold value, whether a gradient of the battery voltage is a positive gradient or a negative gradient is determined at an interval of a reference or, alternatively, predetermined control time, the load current is controlled based on the gradient of the battery voltage at an interval of the reference or, alternatively, predetermined control time, and the battery voltage control operation is finished when the battery voltage becomes higher than a second threshold value.

33 Claims, 17 Drawing Sheets

METHOD OF CONTROLLING A LOAD CURRENT, LOAD CURRENT CONTROL DEVICE, AND MOBILE DEVICE HAVING THE SAME

CROSS-REFERENCE TO RELATED APPLICATION(S)

This application claims priority under 35 USC §119 to Korean Patent Applications No. 10-2012-0087074, filed on Aug. 9, 2012 in the Korean Intellectual Property Office (KIPO), the entire contents of which are incorporated herein by reference.

BACKGROUND

1. Technical Field

Example embodiments of the inventive concepts relate generally to a battery power management technique. For example, embodiments of the inventive concepts relate to a method of controlling a load current, a load current control device, and a mobile device having the load current control device.

2. Description of the Related Art

Recently, according to a mobile convergence trend, a mobile device is manufactured in a small size, and a plurality of function modules that perform various functions (e.g., a communication function, a camera function, etc) may be integrated in the mobile device. However, since the mobile device is manufactured in a small size, it may be difficult to increase a capacity of a battery included in the mobile device, where the battery provides internal voltages to internal components (e.g., a memory device, a storage device, function modules, etc) of the mobile device. Thus, battery power management techniques for the mobile device may become more important because the mobile device needs to perform various functions using a battery having a limited capacity.

SUMMARY

Some example embodiments of the inventive concepts provide a method of controlling a load current capable of preventing an instantaneous, or relatively brief, sharp decrease of a battery voltage when loads instantaneously, or within a relatively short period of time, use a large load current.

Some example embodiments of the inventive concepts provide a load current control device capable of preventing an instantaneous, or relatively brief, sharp decrease of a battery voltage when loads instantaneously, or within a relatively short period of time, use a large load current.

Some example embodiments of the inventive concepts provide a mobile device having the load current control device capable of achieving a high operational stability (or, reliability).

According to some example embodiments of the inventive concepts, a method of controlling a load current may include a step of beginning a battery voltage control operation when a battery voltage becomes lower than a first threshold value, a step of determining whether a gradient of the battery voltage is a positive gradient or a negative gradient at an interval of a reference or, alternatively, predetermined control time, a step of controlling the load current based on the gradient of the battery voltage at an interval of the reference or, alternatively, predetermined control time, and a step of finishing the battery voltage control operation when the battery voltage becomes higher than a second threshold value.

In example embodiments of the inventive concepts, the first threshold value may be equal to the second threshold value.

In example embodiments of the inventive concepts, the first threshold value may be different from the second threshold value.

In example embodiments of the inventive concepts, the step of determining whether the gradient of the battery voltage is the positive gradient or the negative gradient may include a step of measuring the battery voltage at a first time, a step of measuring the battery voltage at a second time, the second time being the time when the reference or, alternatively, predetermined control time elapses after the first time, a step of determining that the gradient of the battery voltage is the negative gradient when the battery voltage at the first time is greater than the battery voltage at the second time, and a step of determining that the gradient of the battery voltage is the positive gradient when the battery voltage at the first time is smaller than the battery voltage at the second time.

In example embodiments of the inventive concepts, the step of controlling the load current may include a step of decreasing the load current when the gradient of the battery voltage is determined to be the negative gradient, and a step of maintaining the load current when the gradient of the battery voltage is determined to be the positive gradient.

In example embodiments of the inventive concepts, the method of controlling the load current may further include a step of increasing the load current after the battery voltage control operation is finished.

In example embodiments of the inventive concepts, the load current may be increased one time after the battery voltage control operation is finished.

In example embodiments of the inventive concepts, the load current may be increased one or more times during a reference or, alternatively, predetermined addition time after the battery voltage control operation is finished.

According to some example embodiments of the inventive concepts, a load current control device may include a voltage comparison unit that decides whether or not to perform a battery voltage control operation by comparing a battery voltage with a threshold value, a gradient determination unit that determines whether a gradient of the battery voltage is a positive gradient or a negative gradient at an interval of a reference or, alternatively, predetermined control time when the voltage comparison unit decides to perform the battery voltage control operation, a load current control unit that controls a load current based on the gradient of the battery voltage at an interval of the reference or, alternatively, predetermined control time when the voltage comparison unit decides to perform the battery voltage control operation, and a timer unit that provides time information to the gradient determination unit at an interval of the reference or, alternatively, predetermined control time when the voltage comparison unit decides to perform the battery voltage control operation.

In example embodiments of the inventive concepts, the voltage comparison unit may provide an enabling signal for performing the battery voltage control operation to the gradient determination unit when the battery voltage becomes lower than the threshold value.

In example embodiments of the inventive concepts, the voltage comparison unit may provide a disenabling signal for finishing the battery voltage control operation to the gradient determination unit when the battery voltage becomes higher than the threshold value.

In example embodiments of the inventive concepts, the gradient determination unit may measure the battery voltage at a first time, may measure the battery voltage at a second time, the second time being the time when the reference or, alternatively, predetermined control time elapses after the first time, and may compare the battery voltage at the first time with the battery voltage at the second time.

In example embodiments of the inventive concepts, the gradient determination unit may determine that the gradient of the battery voltage is the negative gradient when the battery voltage at the first time is greater than the battery voltage at the second time, and may determine that the gradient of the battery voltage is the positive gradient when the battery voltage at the first time is smaller than the battery voltage at the second time.

In example embodiments of the inventive concepts, the load current control unit may decrease the load current when the gradient of the battery voltage is determined to be the negative gradient, and may maintain the load current when the gradient of the battery voltage is determined to be the positive gradient.

In example embodiments of the inventive concepts, the load current control unit may increase the load current after the battery voltage control operation is finished.

According to some example embodiments of the inventive concepts, a load current control device may include a voltage comparison unit that decides whether or not to perform a battery voltage control operation by comparing a battery voltage with a first threshold value and a second threshold value, the first threshold value being different from the second threshold value, a gradient determination unit that determines whether a gradient of the battery voltage is a positive gradient or a negative gradient at an interval of a reference or, alternatively, predetermined control time when the voltage comparison unit decides to perform the battery voltage control operation, a load current control unit that controls a load current based on the gradient of the battery voltage at an interval of the reference or, alternatively, predetermined control time when the voltage comparison unit decides to perform the battery voltage control operation, and a timer unit that provides time information to the gradient determination unit at an interval of the reference or, alternatively, predetermined control time when the voltage comparison unit decides to perform the battery voltage control operation.

In example embodiments of the inventive concepts, the voltage comparison unit may provide an enabling signal for performing the battery voltage control operation to the gradient determination unit when the battery voltage becomes lower than the first threshold value.

In example embodiments of the inventive concepts, the voltage comparison unit may provide a disenabling signal for finishing the battery voltage control operation to the gradient determination unit when the battery voltage becomes higher than the second threshold value.

In example embodiments of the inventive concepts, the gradient determination unit may measure the battery voltage at a first time, may measure the battery voltage at a second time, the second time being the time when the reference or, alternatively, predetermined control time elapses after the first time, and may compare the battery voltage at the first time with the battery voltage at the second time.

In example embodiments of the inventive concepts, the gradient determination unit may determine that the gradient of the battery voltage is the negative gradient when the battery voltage at the first time is greater than the battery voltage at the second time, and may determine that the gradient of the battery voltage is the positive gradient when the battery voltage at the first time is smaller than the battery voltage at the second time.

In example embodiments of the inventive concepts, the load current control unit may decrease the load current when the gradient of the battery voltage is determined to be the negative gradient, and may maintain the load current when the gradient of the battery voltage is determined to be the positive gradient.

In example embodiments of the inventive concepts, the load current control unit may increase the load current after the battery voltage control operation is finished.

According to some example embodiments of the inventive concepts, a mobile device may include an application processor, at least one memory device, at least one storage device, at least one function module, and a power module that provides a battery voltage to the application processor, the memory device, the storage device, and the function module. Here, the power module may include a battery that supplies the battery voltage and a load current control device that controls a load current based on a gradient of the battery voltage when performing a battery voltage control operation.

In example embodiments of the inventive concepts, the load current control device may perform the battery voltage control operation when the battery voltage becomes lower than a threshold value, and may finish the battery voltage control operation when the battery voltage becomes higher than the threshold value.

In example embodiments of the inventive concepts, the load current control device may perform the battery voltage control operation when the battery voltage becomes lower than a first threshold value, and may finish the battery voltage control operation when the battery voltage becomes higher than a second threshold value, the first threshold value being different from the second threshold value.

In example embodiments of the inventive concepts, at an interval of a reference or, alternatively, predetermined control time, the load current control device may decrease the load current by a reference or, alternatively, predetermined value when the gradient of the battery voltage is determined to be a negative gradient, and may maintain the load current when the gradient of the battery voltage is determined to be a positive gradient.

In example embodiments of the inventive concepts, the load current control device may determine whether the gradient of the battery voltage is the positive gradient or the negative gradient by comparing the battery voltage at a first time with the battery voltage at a second time, the second time being the time when the reference or, alternatively, predetermined control time elapses after the first time.

In example embodiments of the inventive concepts, the load current control device may increase the load current after the battery voltage control operation is finished.

Therefore, a method of controlling a load current according to example embodiments of the inventive concepts may prevent an instantaneous, or relatively brief, sharp decrease of a battery voltage by sensing a gradient of the battery voltage to control (i.e., decrease or maintain) the load current based on the gradient of the battery voltage when the battery voltage becomes (i.e., decreases) lower than a reference or, alternatively, predetermined threshold value as loads instantaneously, or within a relatively short period of time, use a large load current.

In addition, a load current control device according to example embodiments of the inventive concepts may prevent an instantaneous, or relatively brief, sharp decrease of a battery voltage by sensing a gradient of the battery voltage to control (i.e., decrease or maintain) the load current based on the gradient of the battery voltage when the battery voltage becomes lower than a reference or, alternatively, predetermined threshold value as loads instantaneously, or within a relatively short period of time, use a large load current.

Further, a mobile device according to example embodiments of the inventive concepts may achieve a high operational stability by using the load current control device.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
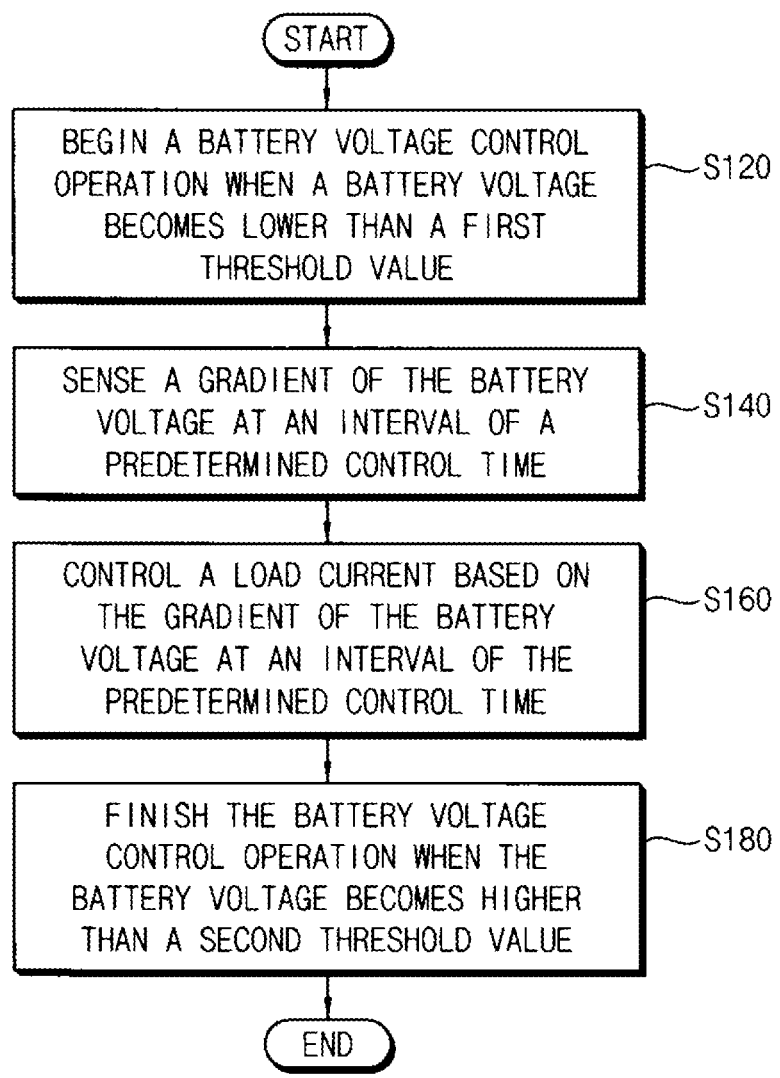
FIG. 1 is a flow chart illustrating a method of controlling a load current according to example embodiments of the inventive concepts.

Various example embodiments of the inventive concepts will be described more fully hereinafter with reference to the accompanying drawings, in which some example embodiments of the inventive concepts are shown. The present inventive concept may, however, be embodied in many different forms and should not be construed as limited to the example embodiments of the inventive concepts set forth herein. Rather, these example embodiments of the inventive concepts are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments of the inventive concepts only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the mobile device, when internal components (i.e., referred to as loads) instantaneously, or within a relatively short period of time, use a large load current, a voltage of the battery (hereinafter, battery voltage) may instantaneously, or within a relatively short period of time, fall into a battery operation-disabled region although an actual battery voltage is in a battery operation-enabled region. Here, the battery operation-disabled region indicates a region below a minimum voltage, where the battery is determined to be a system shutdown battery when a battery voltage is in the region below the minimum voltage. In other words, when the loads of the mobile device instantaneously, or within a relatively short period of time, use the large load current, the mobile device may malfunction, or may stop performing various functions. Therefore, when the loads of the mobile device instantaneously, or within a relatively short period of time, use the large load current, the mobile device is required to prevent an instantaneous, or relatively brief, sharp decrease of the battery voltage.

FIG. 1 is a flow chart illustrating a method of controlling a load current according to example embodiments of the inventive concepts.

Referring to FIG. 1, the method of FIG. 1 may begin a battery voltage control operation when a battery voltage becomes (i.e., decreases) lower than a first threshold value (Step S120), may sense a gradient of the battery voltage (i.e., may determine whether the gradient of the battery voltage is a positive gradient or a negative gradient) at an interval of a reference or, alternatively, predetermined control time (Step S140), may control a load current based on the gradient of the battery voltage at an interval of the reference or, alternatively, predetermined control time (Step S160), and may finish the battery voltage control operation when the battery voltage becomes (i.e., increases) higher than a second threshold value (Step S180).

Generally, in an electronic device (e.g., a mobile device) that operates based on a battery, when a plurality of loads instantaneously, or within a relatively short period of time, use a large load current, a battery voltage may instantaneously, or within a relatively short period of time, fall into a battery operation-disabled region although an actual battery voltage is in a battery operation-enabled region. As a result, when the loads instantaneously, or within a relatively short period of time, use the large load current, the electronic device may malfunction, or may stop performing various functions. Thus, when the loads of the electronic device instantaneously, or within a relatively short period of time, use the large load current, the electronic device is required to prevent an instantaneous, or relatively brief, sharp decrease of the battery voltage. The electronic device may include a plurality of controllable loads of which the load current can be controlled and a plurality of uncontrollable loads of which the load current cannot be controlled. For example, the controllable loads may correspond to an LED driver, an internal function module, etc, and the uncontrollable loads may correspond to an external function module (e.g., function modules of other chips). Thus, it should be understood that the method of FIG. 1 indirectly controls the load current used by the uncontrollable loads by controlling the load current used by the controllable loads as well as the method of FIG. 1 directly controls the load current used by the controllable loads.

The method of FIG. 1 may begin the battery voltage control operation when the battery voltage becomes lower than the first threshold value (Step S120). Here, the first threshold value corresponds to a reference value that is compared with the battery voltage in order to decide whether or not to perform the battery voltage control operation. To prevent the battery voltage from falling into the battery operation-disabled region, the first threshold value may be set to be higher than the minimum voltage, where the battery is determined to be a system shutdown battery when the battery voltage is lower than the minimum voltage. That is, the method of FIG. 1 may decide whether or not to perform the battery voltage control operation by comparing the battery voltage with the first threshold value. As described below, the method of FIG. 1 may perform the battery voltage control operation by controlling (i.e., decreasing or maintaining) the load current used by the loads. For example, the method of FIG. 1 may decrease or maintain the load current when the loads instantaneously, or within a relatively short period of time, use the large load current. As a result, the method of FIG. 1 may efficiently prevent the battery voltage from falling into the battery operation-disabled region.

The method of FIG. 1 may sense the gradient of the battery voltage (i.e., may determine whether the gradient of the battery voltage is the positive gradient or the negative gradient) at an interval of the reference or, alternatively, predetermined control time (Step S140), and may control the load current based on the gradient of the battery voltage at an interval of the reference or, alternatively, predetermined control time (Step S160). That is, the method of FIG. 1 may control (i.e., decrease or maintain) the load current at an interval of the reference or, alternatively, predetermined control time while performing the battery voltage control operation. Here, the reference or, alternatively, predetermined control time may be variously determined according to required conditions for the electronic device. For example, when the reference or, alternatively, predetermined control time is determined to be relatively short, an accuracy of the battery voltage control operation may be improved. However, the battery voltage control operation may be a heavy burden on the electronic device because the number of times controlling the load current is greatly increased. On the other hand, when the reference or, alternatively, predetermined control time is determined to be relatively long, the battery voltage control operation may be a slight burden on the electronic device because the number of times controlling the load current is greatly decreased. However, an accuracy of the battery voltage control operation may be degraded. Therefore, the method of FIG. 1 may efficiently perform the battery voltage control operation by adjusting the reference or, alternatively, predetermined control time based on the above trade-off relation.

The method of FIG. 1 may determine whether the gradient of the battery voltage is the positive gradient or the negative gradient. Specifically, the method of FIG. 1 may measure the battery voltage at a first time, and may measure the battery voltage at a second time, where the second time is the time when the reference or, alternatively, predetermined control time elapses after the first time. Then, the method of FIG. 1 may determine that the gradient of the battery voltage is the negative gradient if the battery voltage at the first time is greater than the battery voltage at the second time, and may determine that the gradient of the battery voltage is the positive gradient if the battery voltage at the first time is smaller than the battery voltage at the second time. Subsequently, the method of FIG. 1 may decrease the load current flowing through the loads when determining that the gradient of the battery voltage is the negative gradient, and may maintain the load current flowing through the loads when determining that the gradient of the battery voltage is the positive gradient. Accordingly, compared to conventional methods, the method of FIG. 1 may efficiently perform the battery voltage control operation by controlling (i.e., decrease or maintain) the load current based on the gradient of the battery voltage.

The method of FIG. 1 may finish the battery voltage control operation when the battery voltage becomes (i.e., increases) higher than the second threshold value (Step S180). In one example embodiment, the first threshold value may be equal to the second threshold value. In this case, the threshold value for deciding whether or not to begin the battery voltage control operation may be equal to the threshold value for deciding whether or not to finish the battery voltage control operation. In another example embodiment, the first threshold value may be different from the second threshold value. In this case, a hysteresis range may exist between the threshold value for deciding whether or not to begin the battery voltage control operation and the threshold value for deciding whether or not to finish the battery voltage control operation. In example embodiments of the inventive concepts, the first and second threshold values may be related such that the first threshold value may be smaller than the second threshold value. However, example embodiments of the inventive concepts are not limited to this relationship. Thus, in some example embodiments of the inventive concepts, the first threshold value may be greater than the second threshold value. In addition, the method of FIG. 1 may increase the load current flowing through the loads after finishing the battery voltage control operation. That is, the method of FIG. 1 may increase the load current flowing through the loads to an optimal level after preventing the battery voltage from instantaneously, or within a relatively short period of time, falling into the battery operation-disabled region. To this end, the method of FIG. 1 may increase the load current flowing through the loads one time after finishing the battery voltage control operation. Alternatively, the method of FIG. 1 may increase the load current flowing through the loads one or more times during a reference or, alternatively, predetermined additional time after finishing the battery voltage control operation. These operations will be described with reference to FIGS. 7 through 12.

As described above, the method of FIG. 1 may prevent an instantaneous, or relatively brief, sharp decrease of the battery voltage by sensing the gradient of the battery voltage to control (i.e., decrease or maintain) the load current based on the gradient of the battery voltage when the battery voltage becomes lower than a reference or, alternatively, predetermined threshold value (i.e., the first threshold value) as the loads of the electronic device instantaneously, or within a relatively short period of time, use the large load current. Since the conventional methods (i.e., conventional load current control techniques) continuously decrease the load current flowing through the loads when the battery voltage becomes lower than the reference or, alternatively, predetermined threshold value, the conventional methods may excessively decrease the load current flowing through the loads although the load current flowing through the loads is sufficiently reduced (i.e., although there is no need to decrease the load current flowing through the loads). On the other hand, by controlling (i.e., decreasing or maintaining) the load current flowing through the loads based on the gradient of the battery voltage, the method of FIG. 1 may not decrease the load current flowing through the loads when the load current flowing through the loads is sufficiently reduced. As a result, the method of FIG. 1 may properly decrease the load current flowing through the loads as well as efficiently preventing the battery voltage from falling into the battery operation-disabled region.

Figure 2:
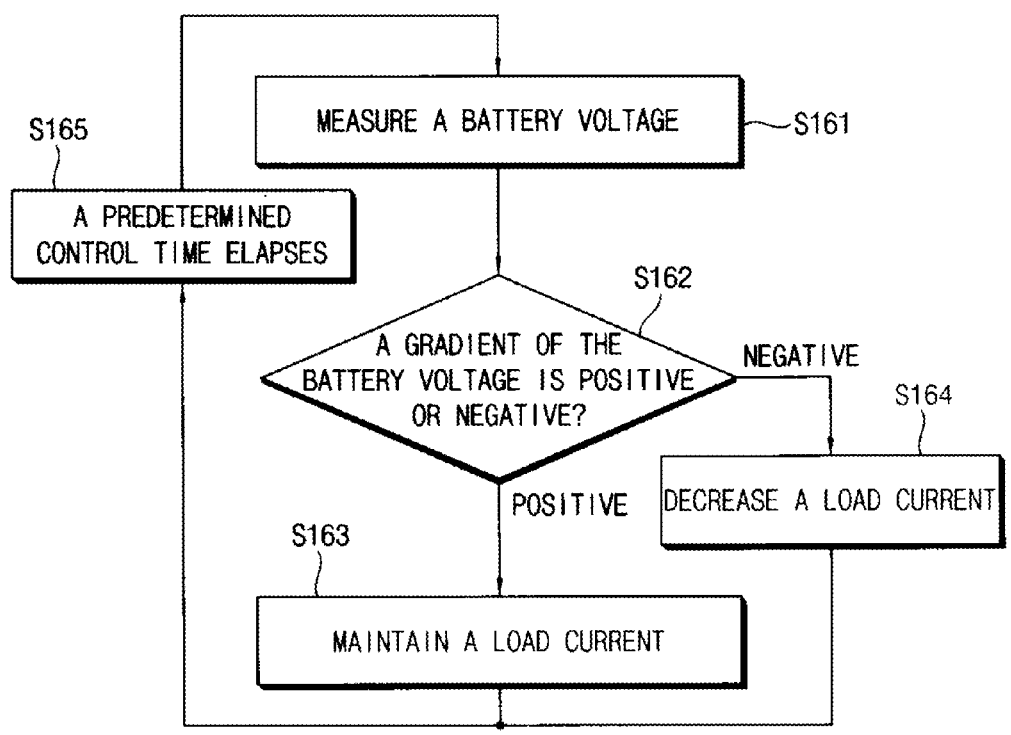
FIG. 2 is a flow chart illustrating a process in which a load current is controlled by a method of FIG. 1.

FIG. 2 is a flow chart illustrating a process in which a load current is controlled by a method of FIG. 1.

Referring to FIG. 2, it is illustrated that the method of FIG. 1 controls (i.e., decreases or maintains) the load current at an interval of a reference or, alternatively, predetermined control time when performing a battery voltage control operation. Specifically, when performing the battery voltage control operation S160, the method of FIG. 1 may measure a battery voltage at an (n)th time (Step S161), and may determine whether a gradient of the battery voltage at the (n)th time is a positive gradient or a negative gradient (Step S162). As described above, the method of FIG. 1 may determine whether the gradient of the battery voltage at the (n)th time is the positive gradient or the negative gradient by comparing the battery voltage at an (n−1)th time with the battery voltage at the (n)th time, where the (n)th time is the time when the reference or, alternatively, predetermined control time elapses after the (n−1)th time. For example, the method of FIG. 1 may determine that the gradient of the battery voltage at the (n)th time is the negative gradient if the battery voltage at the (n−1)th time is greater than the battery voltage at the (n)th time, and may determine that the gradient of the battery voltage at the (n)th time is the positive gradient if the battery voltage at the (n−1)th time is smaller than the battery voltage at the (n)th time.

The method of FIG. 1 may maintain the load current flowing through the loads (Step S163) when determining that the gradient of the battery voltage at the (n)th time is the positive gradient, and may decrease the load current flowing through the loads (Step S164) when determining that the gradient of the battery voltage at the (n)th time is the negative gradient. Subsequently, the method of FIG. 1 may measure the battery voltage at an (n+1)th time, where the (n+1)th time is the time when the reference or, alternatively, predetermined control time elapses after the (n)th time (Step S161) when the reference or, alternatively, predetermined control time elapses (Step S165) after the load current is controlled at the (n)th time. Similarly, the method of FIG. 1 may determine whether the gradient of the battery voltage at the (n+1)th time is the positive gradient or the negative gradient (Step S162), and then may control the load current based on the determination result at the (n+1)th time (Step S163, Step S164). In this way, the method of FIG. 1 may repeatedly control the load current at an interval of the reference or, alternatively, predetermined control time. As a result, the method of FIG. 1 may prevent the battery voltage from falling into the battery operation-disabled region when the loads instantaneously, or within a relatively short period of time, use a large load current.

Figure 3:
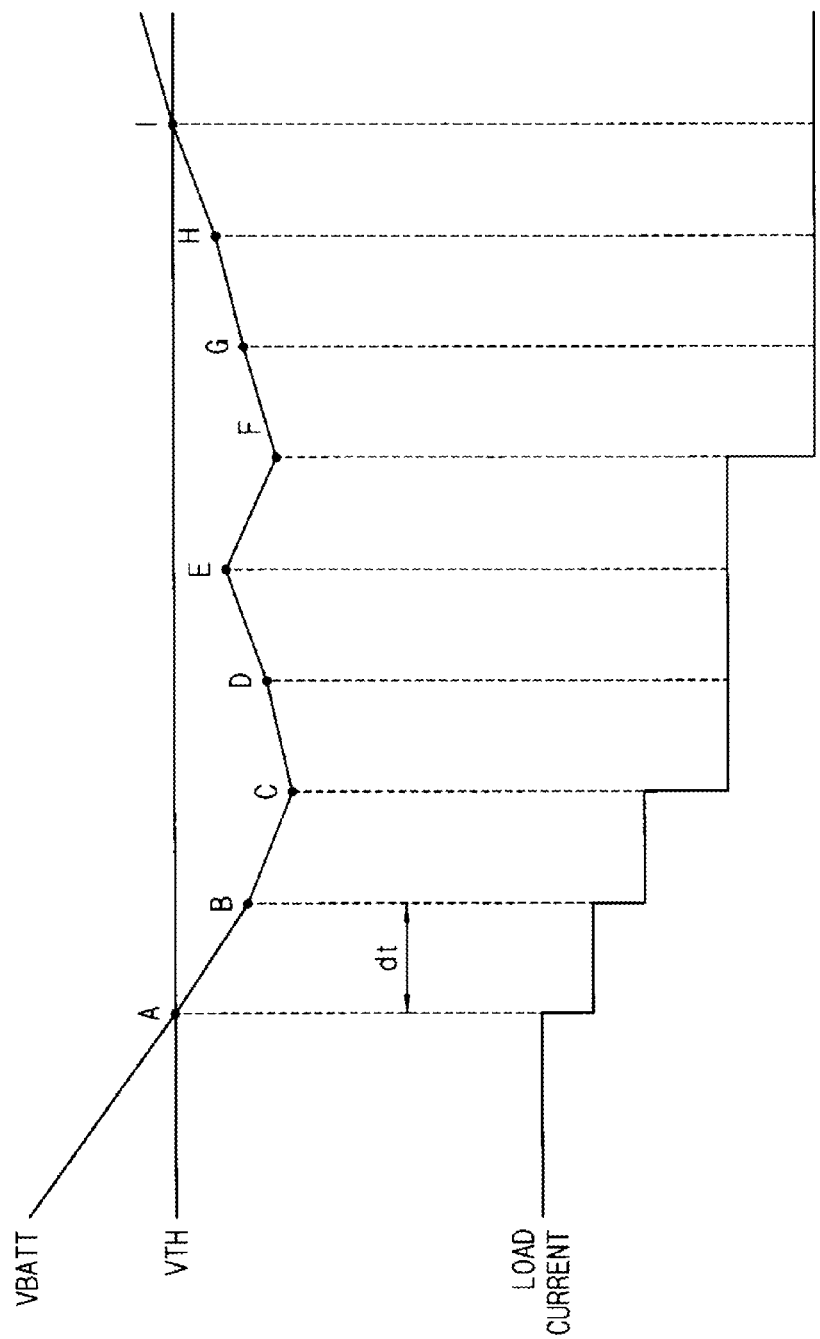
FIG. 3 is a diagram illustrating an example in which a load current is controlled by a method of FIG. 1.

FIG. 3 is a diagram illustrating an example in which a load current is controlled by a method of FIG. 1.

Referring to FIG. 3, the method of FIG. 1 may begin a battery voltage control operation (i.e., indicated as a point A) when a battery voltage VBATT becomes lower than a threshold value VTH as a plurality of loads of an electronic device instantaneously, or within a relatively short period of time, use a large load current. As a result, a monitoring operation on the battery voltage VBATT may be begun when the battery voltage control operation is begun. Here, the method of FIG. 1 may not continuously check the battery voltage VBATT. Thus, the method of FIG. 1 may check (i.e., sample) the battery voltage VBATT only at points A through I. On this basis, the method of FIG. 1 may determine whether a gradient of the battery voltage VBATT is a positive gradient or a negative gradient at an interval of a reference or, alternatively, predetermined control time dt, and may control (i.e., decrease or maintain) a load current based on the gradient of the battery voltage VBATT at an interval of the reference or, alternatively, predetermined control time dt. Here, the reference or, alternatively, predetermined control time dt may be variously determined according to required conditions for the electronic device. Thus, the reference or, alternatively, predetermined control time dt may be properly adjusted based on a trade-off relation between an accuracy of the battery voltage control operation and the number of times controlling the load current. For example, the reference or, alternatively, predetermined control time dt may be determined to be a settling time of the load current.

Specifically, the method of FIG. 1 may determine that the gradient of the battery voltage VBATT is the negative gradient at the point A because the battery voltage VBATT decreases toward a level that is lower than the threshold value VTH at the point A. Thus, the method of FIG. 1 may decrease the load current by a reference or, alternatively, predetermined value at the point A. Subsequently, the method of FIG. 1 may determine that the gradient of the battery voltage VBATT is the negative gradient at the points B and C because a current battery voltage VBATT is smaller than a previous battery voltage VBATT at the points B and C. Thus, the method of FIG. 1 may decrease the load current by the reference or, alternatively, predetermined value at the points B and C. However, the method of FIG. 1 may determine that the gradient of the battery voltage VBATT is the positive gradient at the point D because the current battery voltage VBATT is greater than the previous battery voltage VBATT at the point D. Thus, the method of FIG. 1 may maintain the load current at the point D. Similarly, the method of FIG. 1 may determine that the gradient of the battery voltage VBATT is the positive gradient at the point E because the current battery voltage VBATT is greater than the previous battery voltage VBATT at the point E. Thus, the method of FIG. 1 may maintain the load current at the point E.

Generally, a determination that the gradient of the battery voltage VBATT is the positive gradient indicates that the load current is sufficiently reduced. Thus, the battery voltage VBATT is likely to continuously increase. However, as described above, an electronic device includes a plurality of controllable loads of which the load current can be controlled and a plurality of uncontrollable loads of which the load current cannot be controlled. Thus, a phenomenon in which the battery voltage VBATT instantaneously, or within a relatively short period of time, falls into a battery operation-disabled region may occur because the load current flowing through the uncontrollable loads might instantaneously, or within a relatively short period of time, increase although the load current flowing through the controllable loads are sufficiently reduced. For this reason, the method of FIG. 1 may control (i.e., decrease or maintain) the load current based on the gradient of the battery voltage VBATT at an interval of the reference or, alternatively, predetermined control time dt even when the method of FIG. 1 determines that the gradient of the battery voltage VBATT is the positive gradient. For example, even when the gradient of the battery voltage VBATT is the positive gradient at the points D and E, the gradient of the battery voltage VBATT may be the negative gradient at the point F. Thus, the method of FIG. 1 may decrease the load current by the reference or, alternatively, predetermined value at the point F.

Next, the method of FIG. 1 may determine that the gradient of the battery voltage VBATT is the positive gradient at the points G and H because the current battery voltage VBATT is greater than the previous battery voltage VBATT at the points G and H. Thus, the method of FIG. 1 may continuously maintain the load current. In this situation, the method of FIG. 1 may finish the battery voltage control operation (i.e., indicated as the point I) when the battery voltage VBATT becomes higher than the threshold value VTH. As a result, the monitoring operation on the battery voltage VBATT may be finished. In some example embodiments of the inventive concepts, the method of FIG. 1 may increase the load current during a reference or, alternatively, predetermined additional time when the battery voltage control operation is finished. In this case, the monitoring operation on the battery voltage VBATT may be additionally performed during the reference or, alternatively, predetermined additional time after the battery voltage control operation is finished (i.e., indicated as the point I). As described above, the method of FIG. 1 may prevent an instantaneous, or relatively brief, sharp decrease of the battery voltage VBATT by sensing the gradient of the battery voltage VBATT to decrease or maintain the load current based on the gradient of the battery voltage VBATT when the battery voltage VBATT becomes lower than the reference or, alternatively, predetermined threshold value VTH as the loads of the electronic device instantaneously, or within a relatively short period of time, use the large load current. In addition, the method of FIG. 1 may quickly respond to instantaneous, or relatively brief, current changes because the method of FIG. 1 needs only information related to the gradient of the battery voltage VBATT to control the load current.

Figure 4:
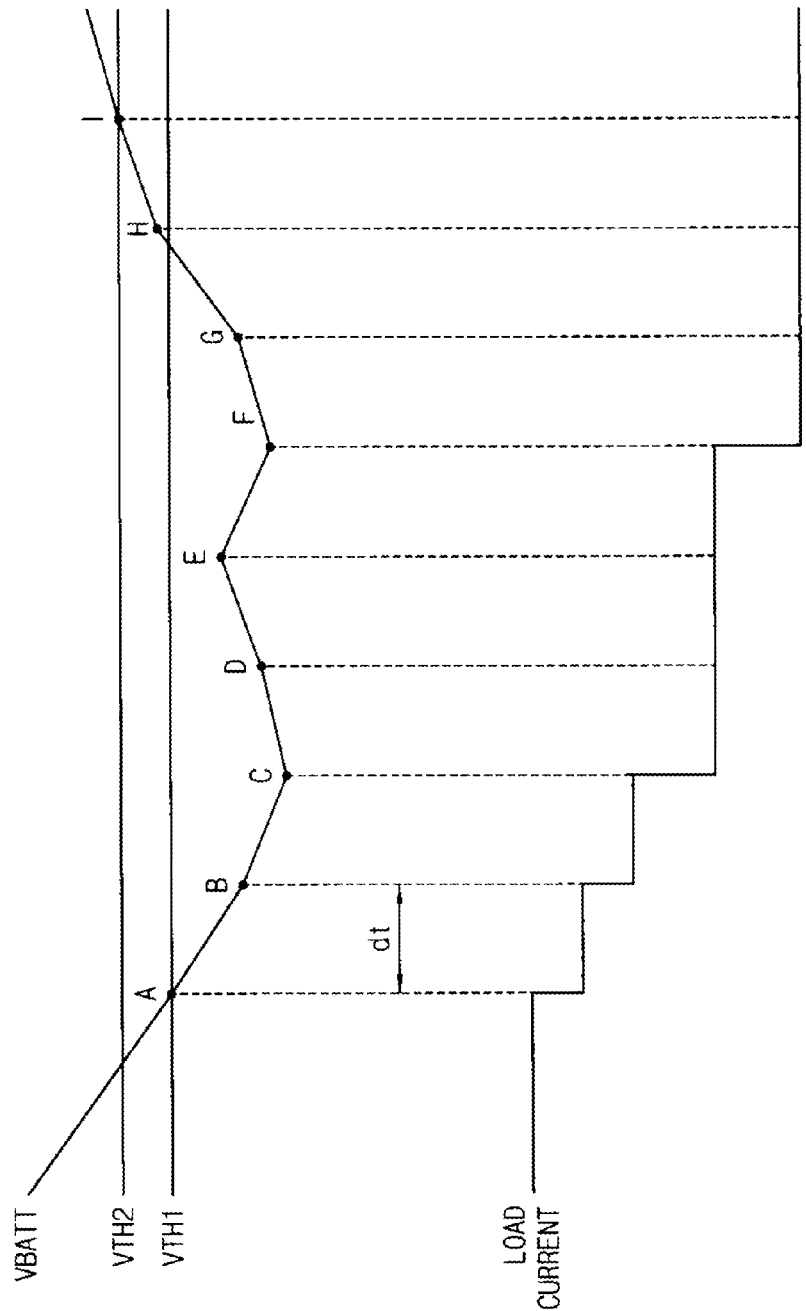
FIG. 4 is a diagram illustrating another example in which a load current is controlled by a method of FIG. 1.

FIG. 4 is a diagram illustrating another example in which a load current is controlled by a method of FIG. 1.

Referring to FIG. 4, the method of FIG. 1 may begin a battery voltage control operation (i.e., indicated as a point A) when a battery voltage VBATT becomes lower than a first threshold value VTH1 as a plurality of loads of an electronic device instantaneously, or within a relatively short period of time, use a large load current. In addition, the method of FIG. 1 may finish the battery voltage control operation (i.e., indicated as a point I) when the battery voltage VBATT becomes higher than a second threshold value VTH2, where the second threshold value VTH2 is greater than the first threshold value VTH1. As a result, a hysteresis range may exist between the first threshold value VTH1 for deciding whether or not to begin the battery voltage control operation and the second threshold value VTH2 for deciding whether or not to finish the battery voltage control operation. That is, it is illustrated in FIG. 3 that the first threshold value VTH1 is equal to the second threshold value VTH2, and it is illustrated in FIG. 4 that the first threshold value VTH1 is different from the second threshold value VTH2. Although it is illustrated in FIG. 4 that the first threshold value VTH1 is greater than the second threshold value VTH2, the present inventive concept is not limited thereto. Thus, in some example embodiments of the inventive concepts, the first threshold value VTH1 may be greater than the second threshold value VTH2. Except that the first threshold value VTH1 for deciding whether or not to begin the battery voltage control operation is different from the second threshold value VTH2 for deciding whether or not to finish the battery voltage control operation, the battery voltage control operation of FIG. 3 is the same as the battery voltage control operation of FIG. 4, and thus the duplicated descriptions will not be repeated.

Figure 5:
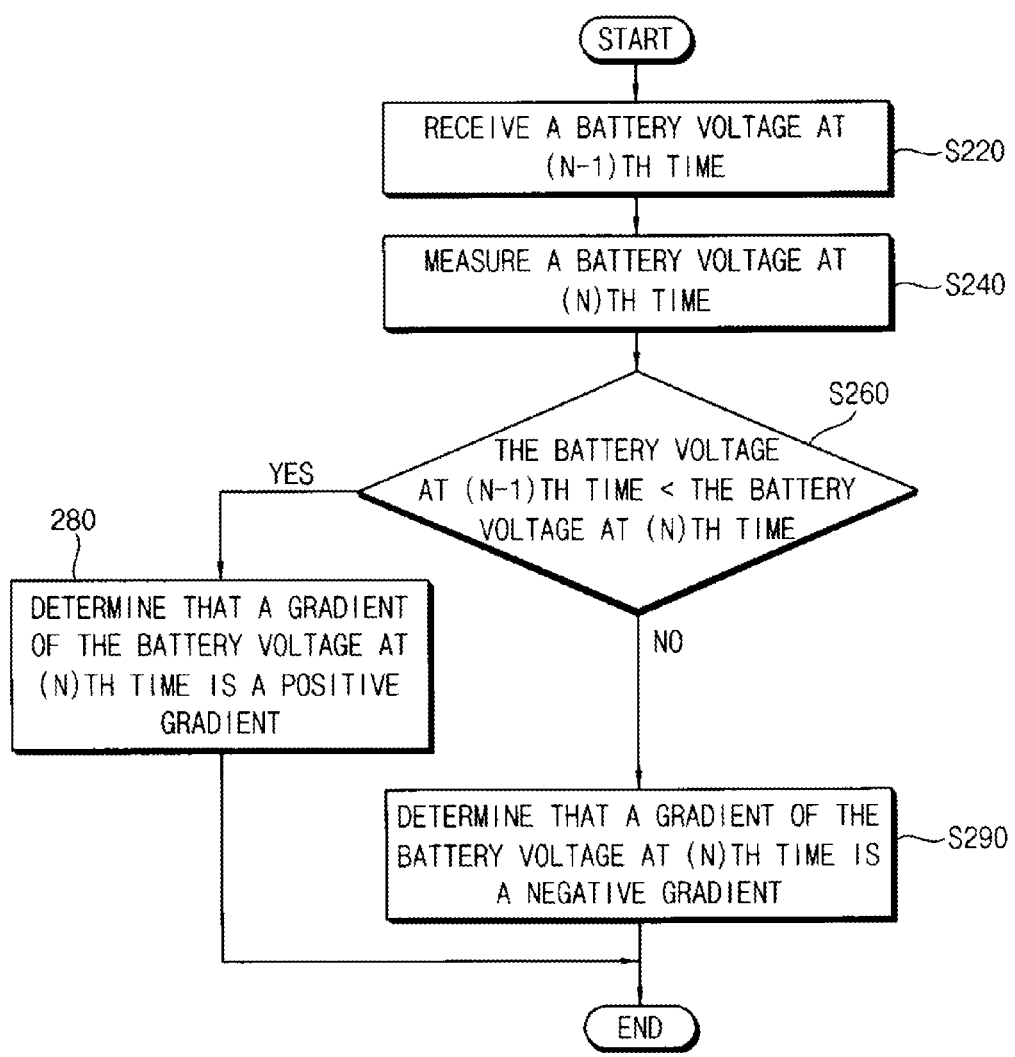
FIG. 5 is a flow chart illustrating a process in which a gradient of a battery voltage is sensed by a method of FIG. 1.
Figure 6:
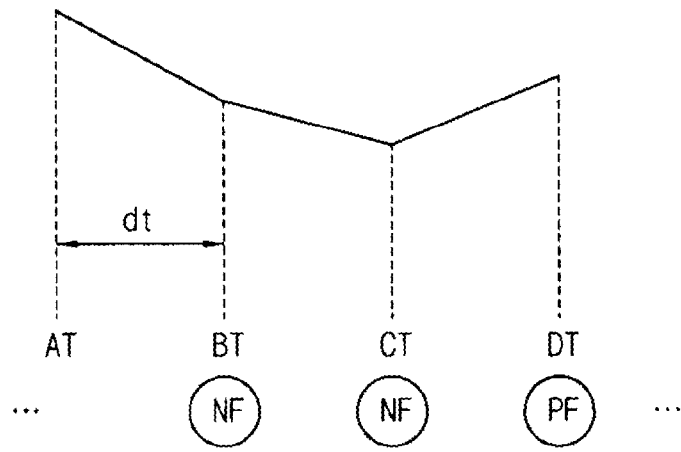
FIG. 6 is a diagram illustrating an example in which a gradient of battery voltage is sensed by a method of FIG. 1.

FIG. 5 is a flow chart illustrating a process in which a gradient of a battery voltage is sensed by a method of FIG. 1. FIG. 6 is a diagram illustrating an example in which a gradient of a battery voltage is sensed by a method of FIG. 1.

Referring to FIGS. 5 and 6, when the method of FIG. 1 performs a battery voltage control operation, the method of FIG. 1 may receive a battery voltage at an (n−1)th time (Step S220), and may measure a battery voltage at an (n)th time (Step S240), where the (n)th time is the time when a reference or, alternatively, predetermined control time dt elapses after the (n−1)th time. Here, the battery voltage at the (n−1)th time may be measured in order to control a load current at the (n−1)th time. Subsequently, since the battery voltage at the (n−1)th time and the battery voltage at the (n)th time are acquired, the method of FIG. 1 may determine whether or not the battery voltage at the (n)th time is greater than the battery voltage at the (n−1)th time (Step S260) by comparing the battery voltage at the (n)th time with the battery voltage at the (n−1)th time. Here, when the battery voltage at the (n)th time is greater than the battery voltage at the (n−1)th time, the method of FIG. 1 may determine that a gradient of the battery voltage at the (n)th time is a positive gradient PF (Step S280). On the other hand, when the battery voltage at the (n−1)th time is greater than the battery voltage at the (n)th time, the method of FIG. 1 may determine that the gradient of the battery voltage at the (n)th time is a negative gradient NF (Step S290).

For example, it is assumed that the method of FIG. 1 controls the load current at an interval of the reference or, alternatively, predetermined control time dt when performing the battery voltage control operation. As illustrated in FIG. 6, a time difference corresponding to the reference or, alternatively, predetermined control time dt exists between adjacent two times (i.e., a first time AT and a second time BT, a second time BT and a third time CT, a third time CT and a fourth time DT). In this case, the gradient of the battery voltage at the second time BT may be determined by comparing the battery voltage at the first time AT with the battery voltage at the second time BT. As a result, since the battery voltage at the first time AT is greater than the battery voltage at the second time BT, the gradient of the battery voltage at the second time BT may be determined to be the negative gradient NF. In addition, the gradient of the battery voltage at the third time CT may be determined by comparing the battery voltage at the second time BT with the battery voltage at the third time CT. As a result, since the battery voltage at the second time BT is greater than the battery voltage at the third time CT, the gradient of the battery voltage at the third time CT may be determined to be the negative gradient NF. Further, the gradient of the battery voltage at the fourth time DT may be determined by comparing the battery voltage at the third time CT with the battery voltage at the fourth time DT. As a result, since the battery voltage at the third time CT is smaller than the battery voltage at the fourth time DT, the gradient of the battery voltage at the fourth time DT may be determined to be the positive gradient PF.

Figure 7:
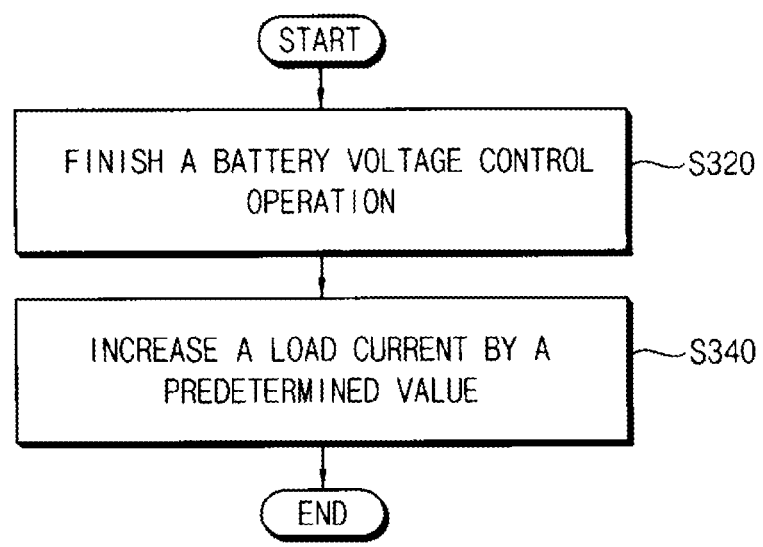
FIG. 7 is a flow chart illustrating a process in which a load current is increased one time after a battery voltage control operation is finished by a method of FIG. 1.
Figure 8:
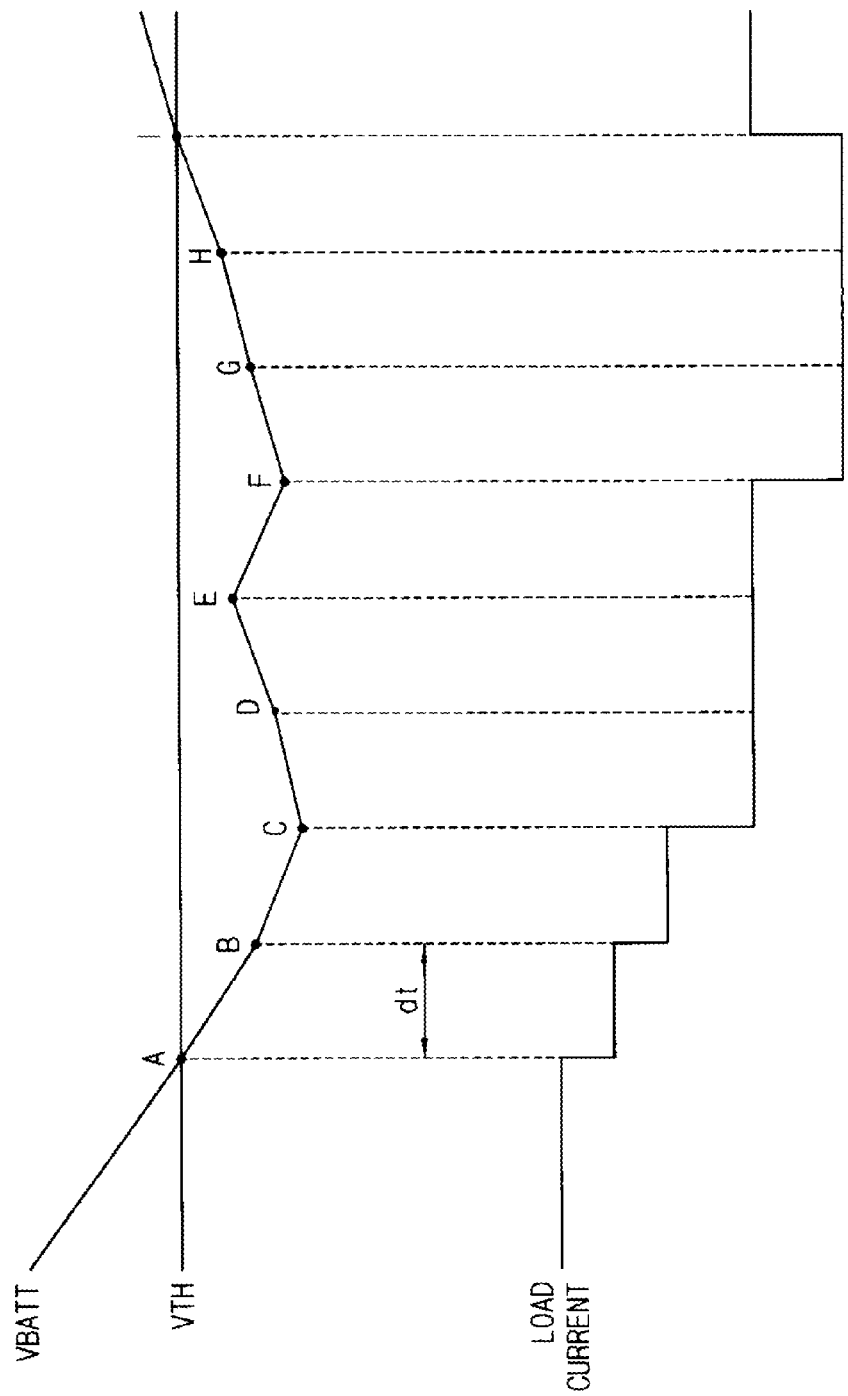
FIG. 8 is a diagram illustrating an example in which a load current is increased one time after a battery voltage control operation is finished by a method of FIG. 1.
Figure 9:
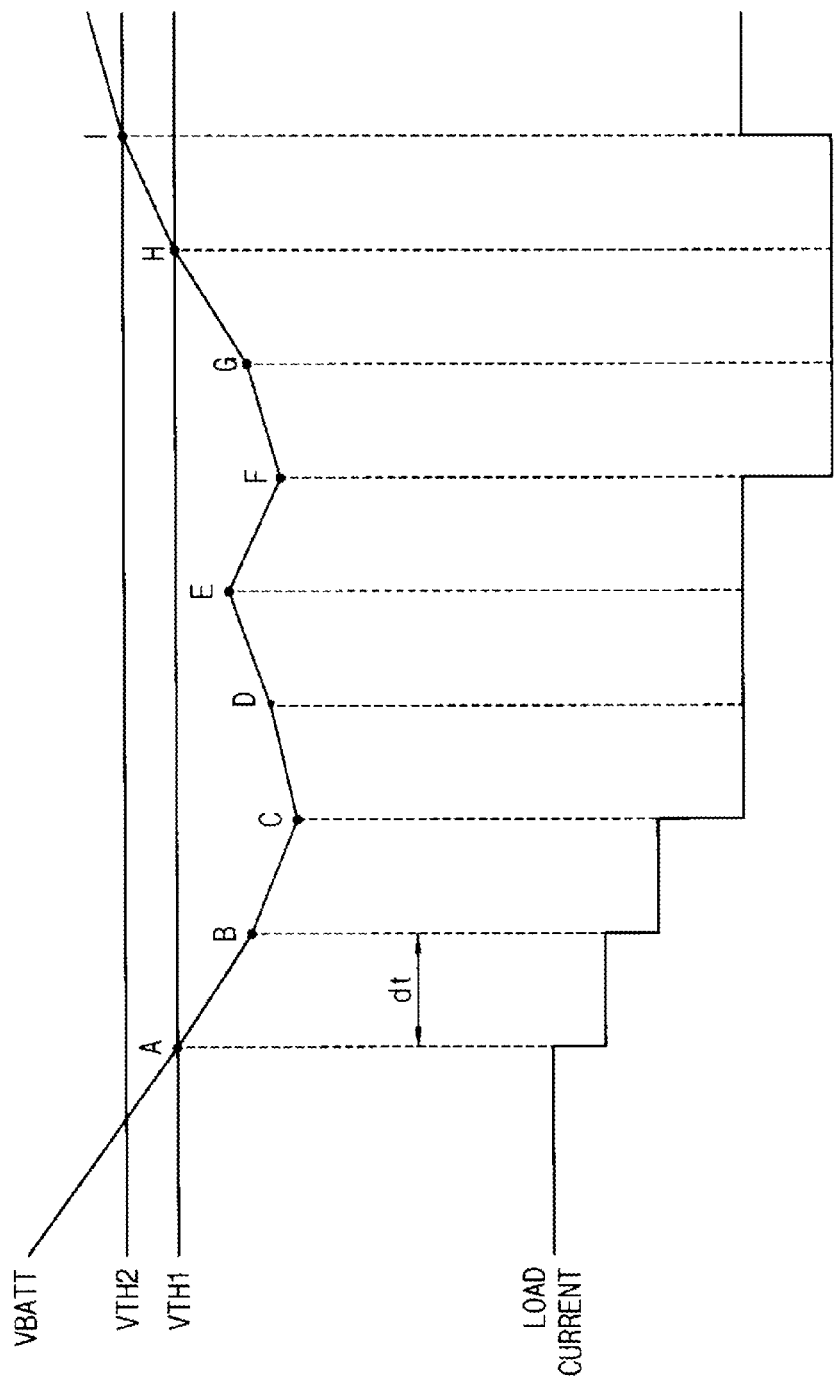
FIG. 9 is a diagram illustrating another example in which a load current is increased one time after a battery voltage control operation is finished by a method of FIG. 1.

FIG. 7 is a flow chart illustrating a process in which a load current is increased one time after a battery voltage control operation is finished by a method of FIG. 1. FIG. 8 is a diagram illustrating an example in which a load current is increased one time after a battery voltage control operation is finished by a method of FIG. 1. FIG. 9 is a diagram illustrating another example in which a load current is increased one time after a battery voltage control operation is finished by a method of FIG. 1.

Referring to FIGS. 7 through 9, the method of FIG. 1 may finish a battery voltage control operation (Step S320), and then may increase a load current flowing through loads by a reference or, alternatively, predetermined value (Step S340).

As illustrated in FIG. 8, the method of FIG. 1 may begin the battery voltage control operation (i.e., indicated as a point A) when the battery voltage VBATT becomes lower than a threshold value VTH as the loads of an electronic device instantaneously, or within a relatively short period of time, use a large load current, and may finish the battery voltage control operation (i.e., indicated as a point I) when the battery voltage VBATT becomes higher than the threshold value VTH as the battery voltage control operation is performed. Here, the method of FIG. 1 may increase the load current flowing through the loads by a reference or, alternatively, predetermined value when the battery voltage control operation is finished (i.e., indicated as the point I). Similarly, as illustrated in FIG. 9, the method of FIG. 1 may begin the battery voltage control operation (i.e., indicated as a point A) when the battery voltage VBATT becomes lower than a first threshold value VTH1 as the loads of the electronic device instantaneously, or within a relatively short period of time, use the large load current, and may finish the battery voltage control operation (i.e., indicated as a point I) when the battery voltage VBATT becomes higher than a second threshold value VTH2 as the battery voltage control operation is performed. As illustrated in FIG. 9, the second threshold value VTH2 may be greater than the first threshold value VTH1. Here, the method of FIG. 1 may increase the load current flowing through the loads by a reference or, alternatively, predetermined value when the battery voltage control operation is finished (i.e., indicated as the point I). As described above, the method of FIG. 1 may increase the load current flowing through the loads when the battery voltage control operation is finished. Thus, the method of FIG. 1 may quickly restore operations of the loads that are limited by the reduced load current flowing through the loads (i.e., by the battery voltage control operation). Although it is illustrated in FIGS. 7 through 9 that the method of FIG. 1 increases the load current one time after the battery voltage control operation is finished, the number of times increasing the load current is not limited thereto.

Figure 10:
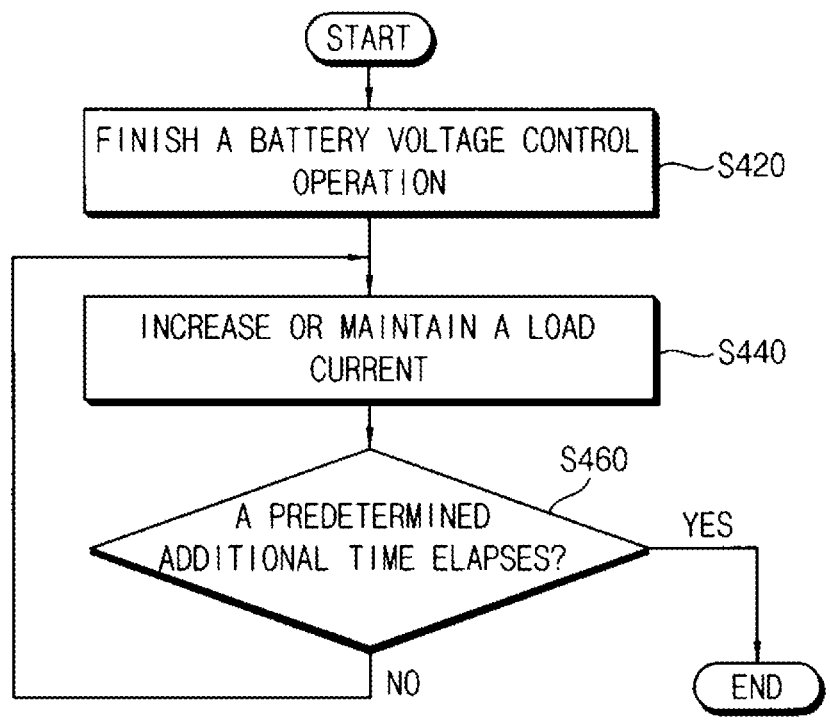
FIG. 10 is a flow chart illustrating a process in which a load current is increased one or more times during a reference or, alternatively, predetermined additional time after a battery voltage control operation is finished by a method of FIG. 1.
Figure 11:
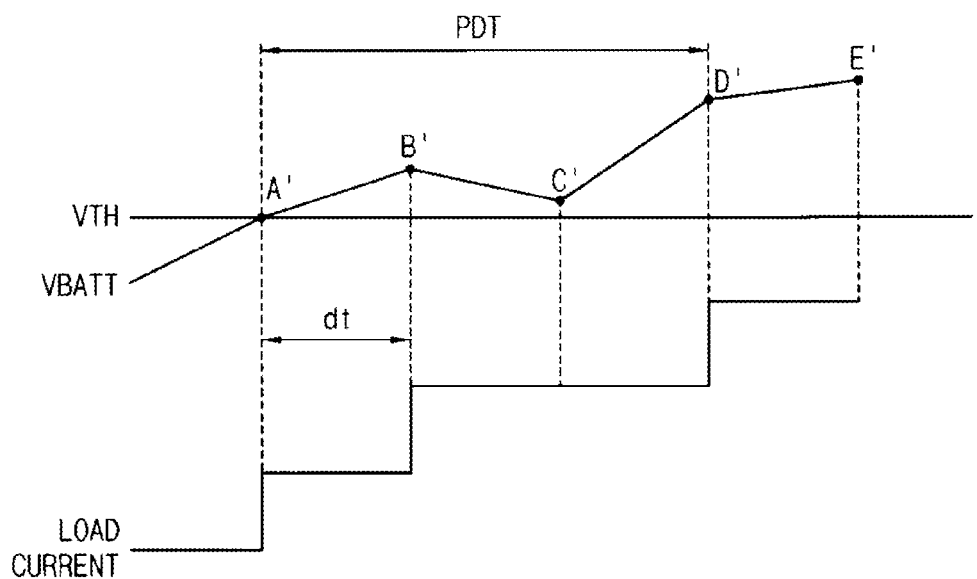
FIG. 11 is a diagram illustrating an example in which a load current is increased one or more times during a reference or, alternatively, predetermined additional time after a battery voltage control operation is finished by a method of FIG. 1.
Figure 12:
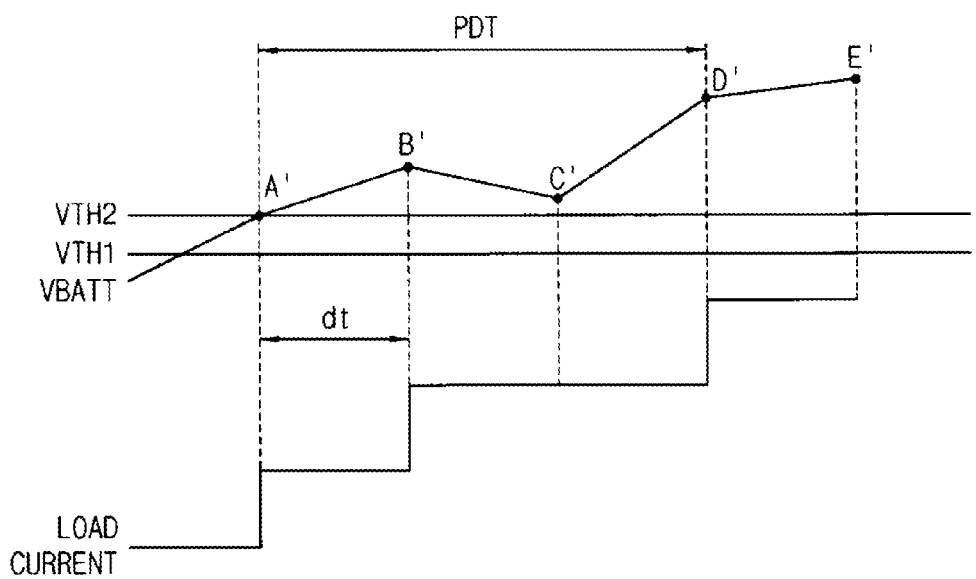
FIG. 12 is a diagram illustrating another example in which a load current is increased one or more times during a reference or, alternatively, predetermined additional time after a battery voltage control operation is finished by a method of FIG. 1.

FIG. 10 is a flow chart illustrating a process in which a load current is increased one or more times during a reference or, alternatively, predetermined additional time after a battery voltage control operation is finished by a method of FIG. 1. FIG. 11 is a diagram illustrating an example in which a load current is increased one or more times during a reference or, alternatively, predetermined additional time after a battery voltage control operation is finished by a method of FIG. 1. FIG. 12 is a diagram illustrating another example in which a load current is increased one or more times during a reference or, alternatively, predetermined additional time after a battery voltage control operation is finished by a method of FIG. 1.

Referring to FIGS. 10 through 12, the method of FIG. 1 may finish a battery voltage control operation (Step S420), and then may increase or maintain a load current based on a gradient of a battery voltage VBATT (Step S440). Here, the method of FIG. 1 may check whether or not a reference or, alternatively, predetermined additional time PDT elapses (Step S460), and then may repeat or finish the above process (i.e., Step S420, Step S440, and Step S460) based on the check result. As illustrated in FIGS. 10 through 12, the method of FIG. 1 may increase or maintain the load current based on the gradient of the battery voltage VBATT after the battery voltage control operation is finished. Thus, a monitoring operation on the battery voltage VBATT may be additionally performed during the reference or, alternatively, predetermined additional time PDT after the battery voltage control operation is finished (i.e., indicated as a point A').

FIG. 11 shows an example in which a first threshold value VTH for deciding whether or not to begin the battery voltage control operation is equal to a second threshold value VTH for deciding whether or not to finish the battery voltage control operation. As illustrated in FIG. 11, the method of FIG. 1 may finish the battery voltage control operation when the battery voltage VBATT becomes higher than the second threshold value VTH as the battery voltage control operation is performed. In addition, the method of FIG. 1 may increase the load current one or more times during a reference or, alternatively, predetermined additional time PDT by increasing or maintaining the load current based on the gradient of the battery voltage VBATT during the reference or, alternatively, predetermined additional time PDT. In detail, the method of FIG. 1 may determine that the gradient of the battery voltage VBATT is the positive gradient at a point A' because the battery voltage VBATT becomes (i.e., increases) higher than the second threshold value VTH. Thus, the method of FIG. 1 may increase the load current by a reference or, alternatively, predetermined value at the point 'A'. Subsequently, the method of FIG. 1 may determine that the gradient of the battery voltage VBATT is the positive gradient at a point B' because the current battery voltage VBATT is greater than the previous battery voltage VBATT. Thus, the method of FIG. 1 may increase the load current by the reference or, alternatively, predetermined value at the point B'. On the other hand, the method of FIG. 1 may determine that the gradient of the battery voltage VBATT is the negative gradient at a point C' because the current battery voltage VBATT is smaller than the previous battery voltage VBATT. Thus, the method of FIG. 1 may maintain the load current at the point C'. Subsequently, the method of FIG. 1 may determine that the gradient of the battery voltage VBATT is the positive gradient at a point D' because the current battery voltage VBATT is greater than the previous battery voltage VBATT. Thus, the method of FIG. 1 may increase the load current by the reference or, alternatively, predetermined value at the point D'. However, the method of FIG. 1 may not increase the load current after the reference or, alternatively, predetermined additional time PDT elapses (i.e., from a point E').

FIG. 12 shows an example in which a first threshold value VTH1 for deciding whether or not to begin the battery voltage control operation is different from a second threshold value VTH2 for deciding whether or not to finish the battery voltage control operation. As illustrated in FIG. 12, the method of FIG. 1 may finish the battery voltage control operation when the battery voltage VBATT becomes higher than the second threshold value VTH2 as the battery voltage control operation is performed. In addition, the method of FIG. 1 may increase the load current one or more times during the reference or, alternatively, predetermined additional time PDT by increasing or maintaining the load current based on the gradient of the battery voltage VBATT during the reference or, alternatively, predetermined additional time PDT. In detail, the method of FIG. 1 may determine that the gradient of the battery voltage VBATT is the positive gradient at a point N because the battery voltage VBATT becomes (i.e., increases) higher than the second threshold value VTH2. Thus, the method of FIG. 1 may increase the load current by the reference or, alternatively, predetermined value at the point 'A'. Subsequently, the method of FIG. 1 may determine that the gradient of the battery voltage VBATT is the positive gradient at a point B' because the current battery voltage VBATT is greater than the previous battery voltage VBATT. Thus, the method of FIG. 1 may increase the load current by the reference or, alternatively, predetermined value at the point B'. On the other hand, the method of FIG. 1 may determine that the gradient of the battery voltage VBATT is the negative gradient at a point C' because the current battery voltage VBATT is smaller than the previous battery voltage VBATT. Thus, the method of FIG. 1 may maintain the load current at the point C'. Subsequently, the method of FIG. 1 may determine that the gradient of the battery voltage VBATT is the positive gradient at a point D' because the current battery voltage VBATT is greater than the previous battery voltage VBATT. Thus, the method of FIG. 1 may increase the load current by the reference or, alternatively, predetermined value at the point D'. However, the method of FIG. 1 may not increase the load current after the reference or, alternatively, predetermined additional time PDT elapses (i.e., from a point E').

In conclusion, the method of FIG. 1 may increase or maintain the load current flowing through the loads based on the gradient of the battery voltage VBATT during the reference or, alternatively, predetermined additional time PDT. As illustrated in FIGS. 10 through 12, the method of FIG. 1 increases the load current one or more times after the battery voltage control operation is finished. As a result, the method of FIG. 1 may quickly restore operations of the loads that are limited by the reduced load current flowing through the loads (i.e., by the battery voltage control operation).

Figure 13:
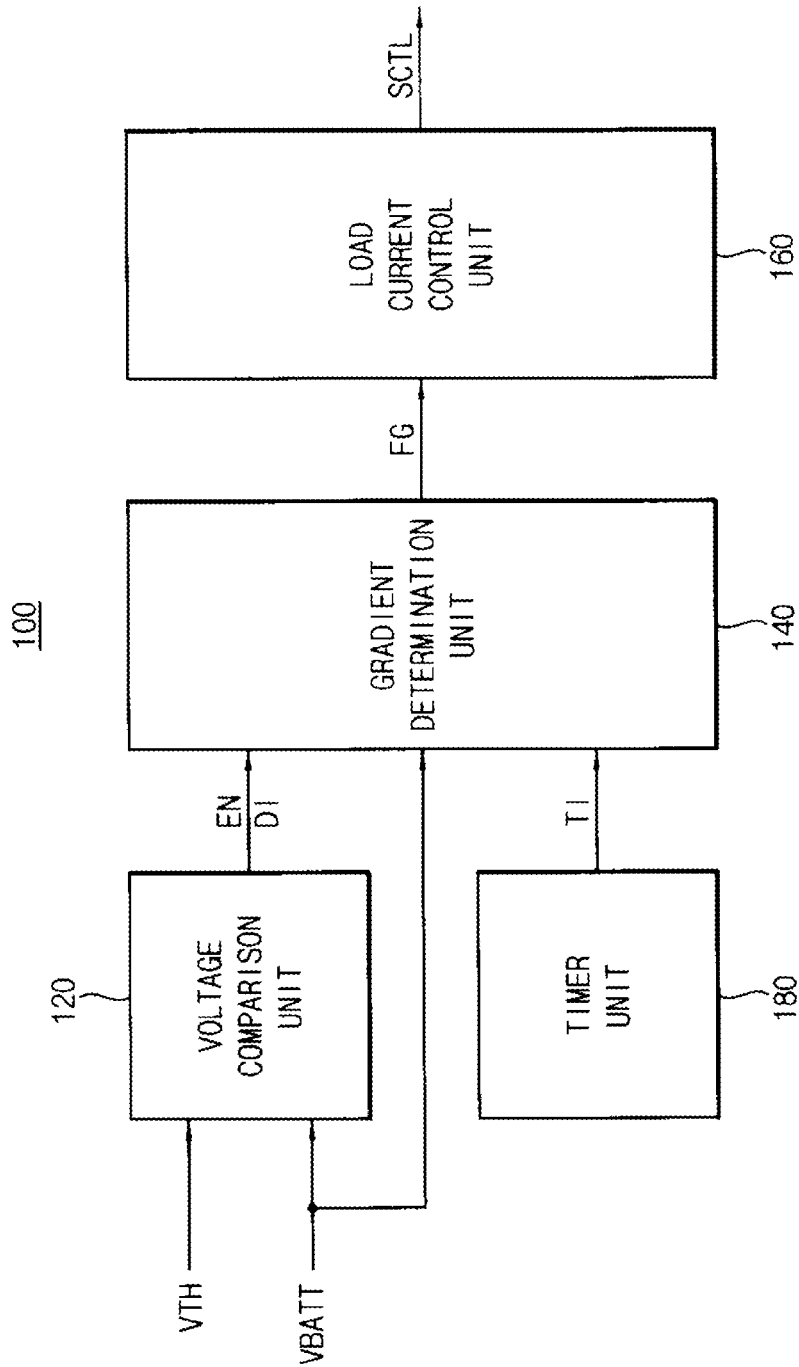
FIG. 13 is a block diagram illustrating a load current control device according to example embodiments of the inventive concepts.

FIG. 13 is a block diagram illustrating a load current control device according to example embodiments of the inventive concepts.

Referring to FIG. 13, the load current control device 100 may include a voltage comparison unit 120, a gradient determination unit 140, a load current control unit 160, and a timer unit 180.

The voltage comparison unit 120 may decide whether or not to perform a battery voltage control operation by comparing a battery voltage VBATT with a threshold value VTH. Specifically, the voltage comparison unit 120 may receive the battery voltage VBATT and the threshold value VTH, may compare the battery voltage VBATT with the threshold value VTH, and may output an enabling signal EN for performing the battery voltage control operation, or a disenabling signal DI for finishing the battery voltage control operation to the gradient determination unit 140 based on the comparison result. Here, the voltage comparison unit 120 may provide the enabling signal EN to the gradient determination unit 140 when the battery voltage VBATT becomes lower than the threshold value VTH, and may provide the disenabling signal DI to the gradient determination unit 140 when the battery voltage VBATT becomes higher than the threshold value VTH. Subsequently, the gradient determination unit 140 may perform the battery voltage control operation based on the enabling signal EN, and may finish the battery voltage control operation based on the disenabling signal DI.

When the voltage comparison unit 120 decides to perform the battery voltage control operation, the gradient determination unit 140 may determine whether a gradient of the battery voltage VBATT is a positive gradient or a negative gradient at an interval of a reference or, alternatively, predetermined control time. In one example embodiment, the gradient determination unit 140 may include a first sampler circuit that samples and outputs the battery voltage VBATT at a first time, a second sampler circuit that samples and outputs the battery voltage VBATT at a second time, where the second time is the time when the reference or, alternatively, predetermined control time elapses after the first time, and a comparator circuit that compares the battery voltage VBATT at the first time with the battery voltage VBATT at the second time. The first sampler circuit, the second sampler circuit, and the comparator circuit will be described below with reference to FIG. 14. Specifically, the gradient determination unit 140 may measure the battery voltage VBATT at the first time, and may measure the battery voltage VBATT at the second time. Next, the gradient determination unit 140 may determine that the gradient of the battery voltage VBATT is the negative gradient when the battery voltage VBATT at the first time is greater than the battery voltage VBATT at the second time, and may determine that the gradient of the battery voltage VBATT is the positive gradient when the battery voltage VBATT at the first time is smaller than the battery voltage VBATT at the second time. Thus, the gradient determination unit 140 may provide a determination result signal FG to the load current control unit 160, where the determination result signal FG indicates whether the gradient of the battery voltage VBATT is the positive gradient or the negative gradient.

When the voltage comparison unit 120 decides to perform the battery voltage control operation, the load current control unit 160 may control (i.e., decrease or maintain) the load current flowing through the loads based on the gradient of the battery voltage VBATT at an interval of the reference or, alternatively, predetermined control time. Specifically, the load current control unit 160 may receive the determination result signal FG from the gradient determination unit 140, where the determination result signal FG indicates whether the gradient of the battery voltage VBATT is the positive gradient or the negative gradient. Subsequently, the load current control unit 160 may decrease the load current flowing through the loads when the determination result signal FG indicates that the gradient of the battery voltage VBATT is the negative gradient, and may maintain the load current flowing through the loads when the determination result signal FG indicates that the gradient of the battery voltage VBATT is the positive gradient. Thus, the load current control unit 160 may output a control signal SCTL to maintain the load current flowing through the loads, or to decrease the load current flowing through the loads. In some example embodiments of the inventive concepts, the load current control unit 160 may increase the load current flowing through the loads when the battery voltage control operation is finished. For example, the load current control unit 160 may increase the load current flowing through the loads one time after the battery voltage control operation is finished, or may increase the load current flowing through the loads one or more times during a reference or, alternatively, predetermined additional time after the battery voltage control operation is finished. Since these are described above, the duplicated descriptions will not be repeated.

When the voltage comparison unit 120 decides to perform the battery voltage control operation, the timer unit 180 may provide time information TI to the gradient determination unit 140 at an interval of the reference or, alternatively, predetermined control time. Thus, at an interval of the reference or, alternatively, predetermined control time, the gradient determination unit 140 may determine whether the gradient of the battery voltage VBATT is the positive gradient or the negative gradient by using the time information TI. Accordingly, at an interval of the reference or, alternatively, predetermined control time, the load current control unit 160 may control (i.e., decrease or maintain) the load current flowing through the loads based on the gradient of the battery voltage VBATT. As described above, the load current control device 100 may include the voltage comparison unit 120, the gradient determination unit 140, the load current control unit 160, and the timer unit 180. On this basis, the load current control device 100 may prevent an instantaneous, or relatively brief, sharp decrease of the battery voltage VBATT by sensing the gradient of the battery voltage VBATT to control (i.e., decrease or maintain) the load current based on the gradient of the battery voltage VBATT when the battery voltage VBATT becomes (i.e., decreases) lower than the reference or, alternatively, predetermined threshold value VTH as the loads instantaneously, or within a relatively short period of time, use a large load current. In addition, the load current control device 100 may quickly respond to instantaneous, or relatively brief, current changes because the load current control device 100 needs only information related to the gradient of the battery voltage VBATT to control the load current flowing through the loads.

Figure 14:
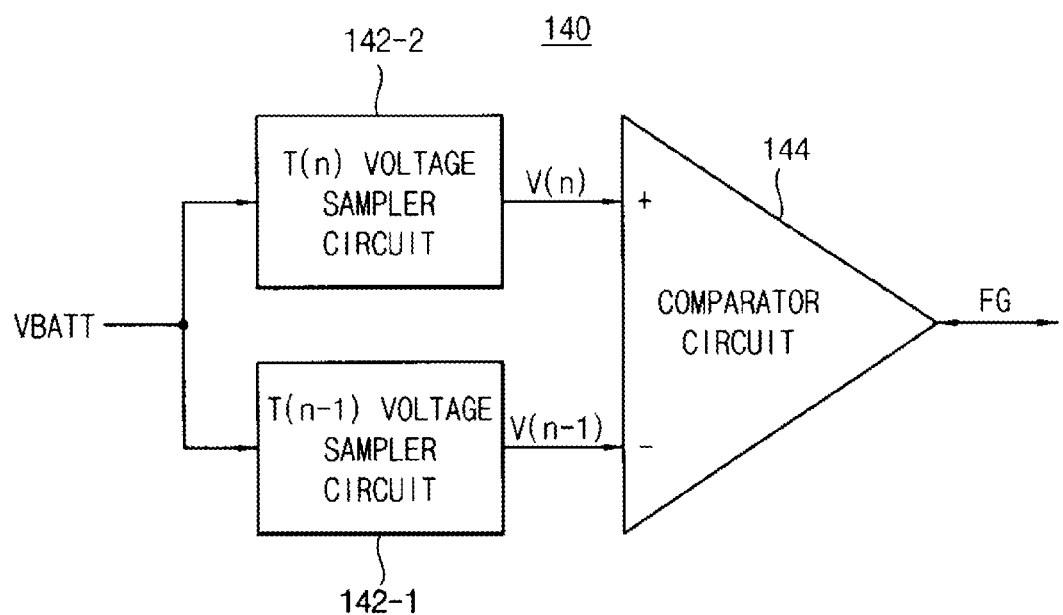
FIG. 14 is a block diagram illustrating a gradient determination unit included in a load current control device of FIG. 13.

FIG. 14 is a block diagram illustrating a gradient determination unit included in a load current control device of FIG. 13.

Referring to FIG. 14, the gradient determination unit 140 may include a first sampler circuit 142-1, a second sampler circuit 142-2, and a comparator circuit 144.

The first sampler circuit 142-1 may sample a battery voltage VBATT at an (n−1)th time, and may output the battery voltage V(n−1) at the (n−1)th time to a first input terminal of the comparator circuit 144. The second sampler circuit 142-2 may sample a battery voltage VBATT at an (n)th time, and may output the battery voltage V(n) at the (n)th time to a second input terminal of the comparator circuit 144. Here, the (n)th time is the time when a reference or, alternatively, predetermined control time elapses after the (n−1)th time. Although it is illustrated in FIG. 14 that the first input terminal corresponds to a negative input terminal and the second input terminal corresponds to a positive input terminal, a structure of the gradient determination unit 140 is not limited thereto. For example, the first input terminal may correspond to the positive input terminal, and the second input terminal may correspond to the negative input terminal. The comparator circuit 144 may receive the battery voltage V(n−1) at the (n−1)th time and the battery voltage V(n) at the (n)th time, and may compare the battery voltage V(n−1) at the (n−1)th time with the battery voltage V(n) at the (n)th time. Based on the comparison result, the comparator circuit 144 may output a determination result signal FG indicating whether a gradient of the battery voltage VBATT is a positive gradient or a negative gradient. Here, the gradient determination unit 140 may determine that the gradient of the battery voltage VBATT is the negative gradient when the battery voltage V(n−1) at the (n−1)th time is greater than the battery voltage V(n) at the (n)th time, and may determine that the gradient of the battery voltage VBATT is the positive gradient when the battery voltage V(n−1) at the (n−1)th time is smaller than the battery voltage V(n) at the (n)th time.

Figure 15:
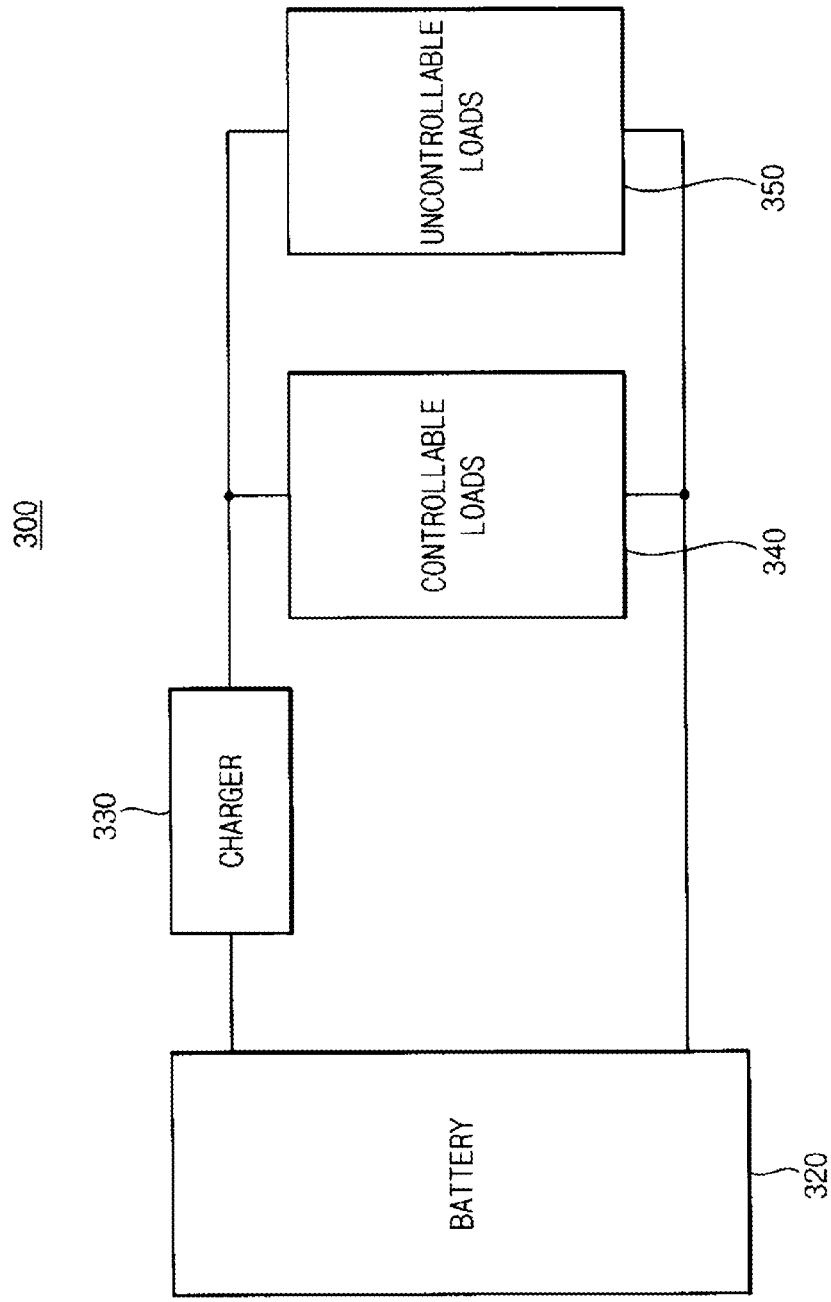
FIG. 15 is a block diagram illustrating a battery voltage control operation that is performed by a load current control device of FIG. 13.
Figure 16:
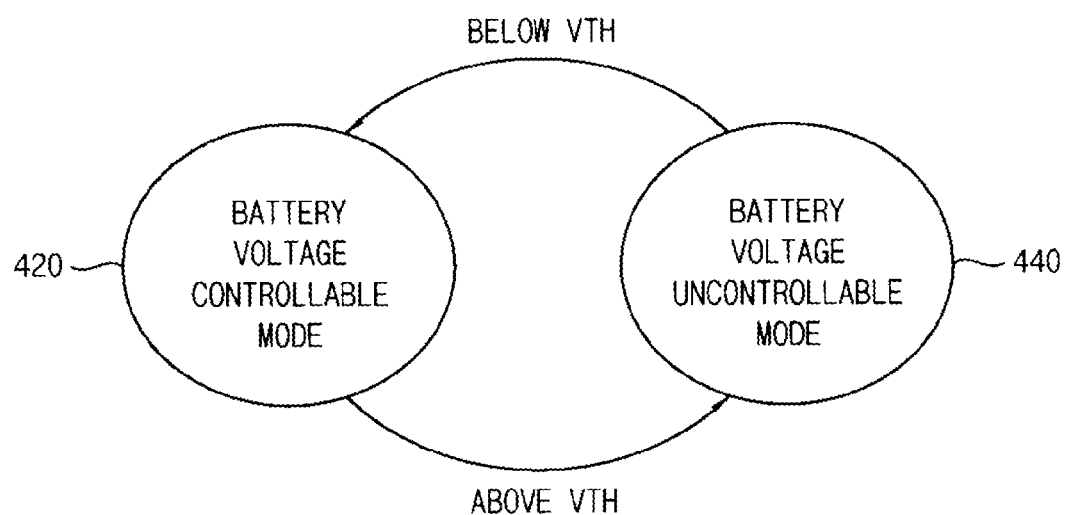
FIG. 16 is a concept diagram illustrating a battery voltage control operation that is performed by a load current control device of FIG. 13.

FIG. 15 is a block diagram illustrating a battery voltage control operation that is performed by a load current control device of FIG. 13. FIG. 16 is a concept diagram illustrating a battery voltage control operation that is performed by a load current control device of FIG. 13.

Referring to FIGS. 15 and 16, the electronic device 300 that operates based on a battery 320 may include a battery 320, a charger 330, controllable loads 340, and uncontrollable loads 350. Here, the battery 320 may provide a battery voltage to the controllable loads 340 and the uncontrollable loads 350 using the charger 330. The charger 330 may perform a charging operation on the battery 320, or may deliver the battery voltage to the controllable loads 340 and the uncontrollable loads 350. As described above, the controllable loads 340 indicate loads of which a load current can be controlled by the electronic device 300. For example, the controllable loads 340 may include an LED driver, an internal function module, etc. On the other hand, the uncontrollable loads 350 indicate loads of which a load current cannot be controlled by the electronic device 300. For example, the uncontrollable loads 350 may include an external function module, etc. When the controllable loads 340 and the uncontrollable loads 350 instantaneously, or within a relatively short period of time, use a large load current, the battery voltage may instantaneously, or within a relatively short period of time, fall into a battery operation-disabled region although an actual battery voltage is in a battery operation-enabled region. As a result, the electronic device 300 may malfunction, or may stop performing various functions.

However, the load current control device 100 may prevent an instantaneous, or relatively brief, sharp decrease of the battery voltage when the controllable loads 340 and the uncontrollable loads 350 instantaneously, or within a relatively short period of time, use the large load current in the electronic device 300. For this operation, as illustrated in FIG. 16, the load current control device 100 may operate in either a battery voltage controllable mode 420 or a battery voltage uncontrollable mode 440. Specifically, the load current control device 100 may perform a battery voltage control operation when the battery voltage becomes (i.e., decreases) lower than a reference or, alternatively, predetermined threshold value VTH as the controllable loads 340 and the uncontrollable loads 350 instantaneously, or within a relatively short period of time, use the large load current in the electronic device 300. In other words, the load current control device 100 may operate in the battery voltage controllable mode 420. On the other hand, the load current control device 100 may finish the battery voltage control operation when the battery voltage becomes (i.e., increases) higher than the reference or, alternatively, predetermined threshold value VTH. In other words, the load current control device 100 may operate in the battery voltage uncontrollable mode 440.

As described above, the load current control device 100 may decide whether or not to perform the battery voltage control operation based on the reference or, alternatively, predetermined threshold value VTH. In one example embodiment, the threshold value VTH for deciding whether or not to begin the battery voltage control operation may be equal to the threshold value VTH for deciding whether or not to finish the battery voltage control operation. In another example embodiment, the threshold value VTH for deciding whether or not to begin the battery voltage control operation may be different from the threshold value VTH for deciding whether or not to finish the battery voltage control operation. In this way, the load current control device 100 may prevent an instantaneous, or relatively brief, sharp decrease of the battery voltage by sensing the gradient of the battery voltage to control (i.e., decrease or maintain) the load current based on the gradient of the battery voltage when the battery voltage becomes lower than the threshold value VTH. In addition, the load current control device 100 may quickly respond to instantaneous, or relatively brief, current changes because the load current control device 100 needs only information related to the gradient of the battery voltage to control the load current. Meanwhile, it should be understood that the load current control device 100 indirectly controls the load current used by the uncontrollable loads 350 by controlling the load current used by the controllable loads 340 as well as the load current control device 100 directly controls the load current used by the controllable loads 340.

Figure 17:
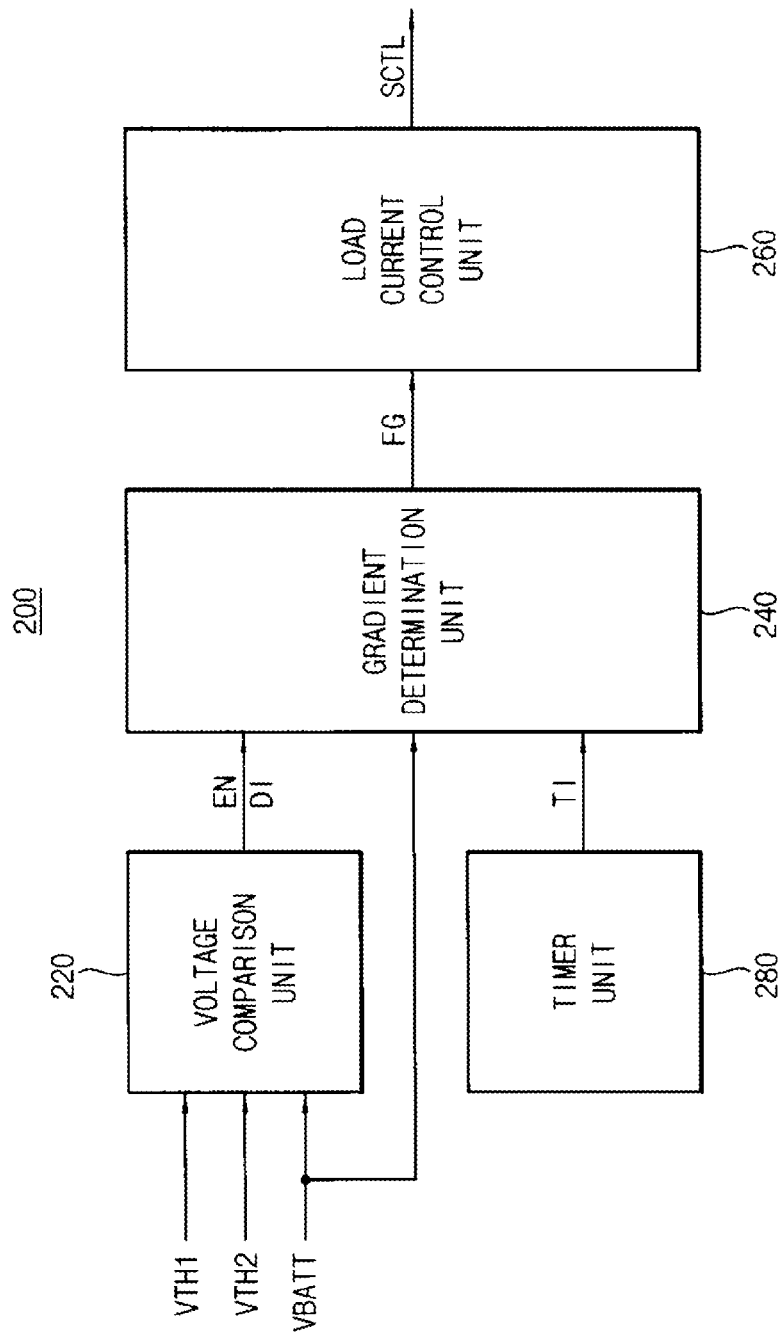
FIG. 17 is a block diagram illustrating a load current control device according to example embodiments of the inventive concepts.

FIG. 17 is a block diagram illustrating a load current control device according to example embodiments of the inventive concepts.

Referring to FIG. 17, the load current control device 200 may include a voltage comparison unit 220, a gradient determination unit 240, a load current control unit 260, and a timer unit 280.

The voltage comparison unit 220 may decide whether or not to perform a battery voltage control operation by comparing a battery voltage VBATT with a first threshold value VTH1 for deciding whether or not to begin the battery voltage control operation and a second threshold value VTH2 for deciding whether or not to finish the battery voltage control operation. In one example embodiment, the first threshold value VTH1 may be different from the second threshold value VTH2. In another example embodiment, the first threshold value VTH1 may be equal to the second threshold value VTH2. However, the present inventive concept is not limited thereto. In case that the first threshold value VTH1 is different from the second threshold value VTH2, a hysteresis range may exist between the first threshold value VTH1 for deciding whether or not to begin the battery voltage control operation and the second threshold value VTH2 for deciding whether or not to finish the battery voltage control operation. Specifically, the voltage comparison unit 220 may receive the battery voltage VBATT, the first threshold value VTH1, and the second threshold value VTH2, may compare the battery voltage VBATT with the first threshold value VTH1 and the second threshold value VTH2, and may output an enabling signal EN for performing the battery voltage control operation, or a disenabling signal DI for finishing the battery voltage control operation to the gradient determination unit 240 based on the comparison result. Here, the voltage comparison unit 220 may provide the enabling signal EN to the gradient determination unit 240 when the battery voltage VBATT becomes lower than the first threshold value VTH1, and may provide the disenabling signal DI to the gradient determination unit 240 when the battery voltage VBATT becomes higher than the second threshold value VTH2. Subsequently, the gradient determination unit 240 may perform the battery voltage control operation based on the enabling signal EN, and may finish the battery voltage control operation based on the disenabling signal DI.

When the voltage comparison unit 220 decides to perform the battery voltage control operation, the gradient determination unit 240 may determine whether a gradient of the battery voltage VBATT is a positive gradient or a negative gradient at an interval of a reference or, alternatively, predetermined control time. In one example embodiment, the gradient determination unit 240 may include a first sampler circuit that samples and outputs the battery voltage VBATT at a first time, a second sampler circuit that samples and outputs the battery voltage VBATT at a second time, where the second time is the time when the reference or, alternatively, predetermined control time elapses after the first time, and a comparator circuit that compares the battery voltage VBATT at the first time with the battery voltage VBATT at the second time. Specifically, the gradient determination unit 240 may measure the battery voltage VBATT at the first time, and may measure the battery voltage VBATT at the second time. Next, the gradient determination unit 240 may determine that the gradient of the battery voltage VBATT is the negative gradient when the battery voltage VBATT at the first time is greater than the battery voltage VBATT at the second time, and may determine that the gradient of the battery voltage VBATT is the positive gradient when the battery voltage VBATT at the first time is smaller than the battery voltage VBATT at the second time. Thus, the gradient determination unit 240 may provide a determination result signal FG to the load current control unit 260, where the determination result signal FG indicates whether the gradient of the battery voltage VBATT is the positive gradient or the negative gradient.

When the voltage comparison unit 220 decides to perform the battery voltage control operation, the load current control unit 260 may control (i.e., decrease or maintain) the load current flowing through the loads based on the gradient of the battery voltage VBATT at an interval of the reference or, alternatively, predetermined control time. Specifically, the load current control unit 260 may receive the determination result signal FG from the gradient determination unit 240, where the determination result signal FG indicates whether the gradient of the battery voltage VBATT is the positive gradient or the negative gradient. Subsequently, the load current control unit 260 may decrease the load current flowing through the loads when the determination result signal FG indicates that the gradient of the battery voltage VBATT is the negative gradient, and may maintain the load current flowing through the loads when the determination result signal FG indicates that the gradient of the battery voltage VBATT is the positive gradient. Thus, the load current control unit 260 may output a control signal SCTL to maintain the load current flowing through the loads, or to decrease the load current flowing through the loads. In some example embodiments of the inventive concepts, the load current control unit 260 may increase the load current flowing through the loads when the battery voltage control operation is finished. For example, the load current control unit 260 may increase the load current flowing through the loads one time after the battery voltage control operation is finished, or may increase the load current flowing through the loads one or more times during a reference or, alternatively, predetermined additional time after the battery voltage control operation is finished. Since these are described above, the duplicated descriptions will not be repeated.

When the voltage comparison unit 220 decides to perform the battery voltage control operation, the timer unit 280 may provide time information TI to the gradient determination unit 240 at an interval of the reference or, alternatively, predetermined control time. Thus, at an interval of the reference or, alternatively, predetermined control time, the gradient determination unit 240 may determine whether the gradient of the battery voltage VBATT is the positive gradient or the negative gradient by using the time information TI. Accordingly, at an interval of the reference or, alternatively, predetermined control time, the load current control unit 260 may control (i.e., decrease or maintain) the load current flowing through the loads based on the gradient of the battery voltage VBATT. As described above, the load current control device 200 may include the voltage comparison unit 220, the gradient determination unit 240, the load current control unit 260, and the timer unit 280. On this basis, the load current control device 200 may prevent an instantaneous, or relatively brief, sharp decrease of the battery voltage VBATT by sensing the gradient of the battery voltage VBATT to control (i.e., decrease or maintain) the load current based on the gradient of the battery voltage VBATT when the battery voltage VBATT becomes (i.e., decreases) lower than a reference or, alternatively, predetermined threshold value (i.e., the first threshold value VTH1) as the loads instantaneously, or within a relatively short period of time, use a large load current. In addition, the load current control device 200 may quickly respond to instantaneous, or relatively brief, current changes because the load current control device 200 needs only information related to the gradient of the battery voltage VBATT to control the load current flowing through the loads.

Figure 18:
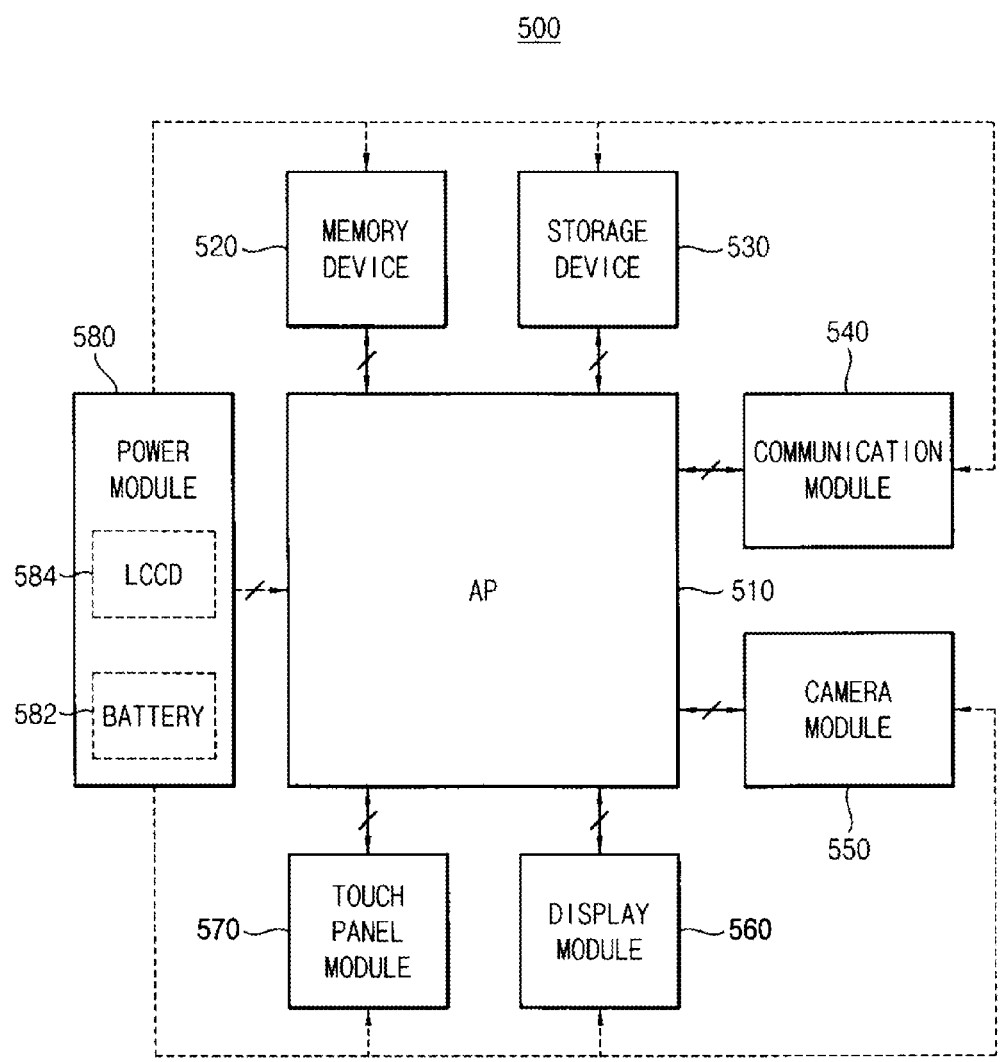
FIG. 18 is a block diagram illustrating a mobile device having a load current control device according to example embodiments of the inventive concepts.
Figure 19:
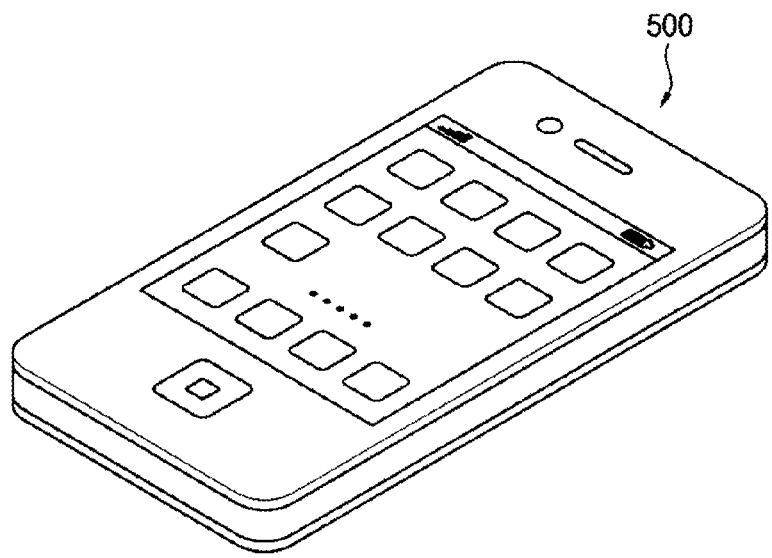
FIG. 19 is a block diagram illustrating an example in which a mobile device of FIG. 18 is implemented as a smart-phone.

FIG. 18 is a block diagram illustrating a mobile device having a load current control device according to example embodiments of the inventive concepts. FIG. 19 is a block diagram illustrating an example in which a mobile device of FIG. 18 is implemented as a smart-phone.

Referring to FIGS. 18 and 19, the mobile device 500 may include an application processor (AP) 510, a memory device 520, a storage device 530, function modules 540, 550, 560, and 570, and a power module 580 that provides an internal voltage to the application processor 510, the memory device 520, the storage device 530, and the function modules 540, 550, 560 and 570, respectively. Here, the power module 580 may include a load current control device that controls a load current based on a gradient of a battery voltage when performing a battery voltage control operation. As illustrated in FIG. 19, the mobile device 500 may be implemented as a smart-phone.

The application processor 510 may control overall operations of the mobile device 500. That is, the application processor 510 may control the memory device 520, the storage device 530, and the function modules 540, 550, 560, and 570. The memory device 520 and the storage device 530 may store data for operations of the mobile device 500. For example, the memory device 520 may correspond to a volatile semiconductor memory device such as a dynamic random access memory (DRAM) device, a static random access memory (SRAM) device, a mobile DRAM, etc. In addition, the storage device 530 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some example embodiments of the inventive concepts, the storage device 530 may correspond to a solid state drive (SSD) device, a hard disk drive (HDD) device, a CD-ROM device, etc.

The function modules 540, 550, 560, and 570 may perform various functions of the mobile device 500. For example, the mobile device 500 may include a communication module 540 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, etc), a camera module 550 that performs a camera function, a display module 560 that performs a display function, a touch panel module 570 that performs a touch sensing function, etc. In some example embodiments of the inventive concepts, the mobile device 500 may further include a global positioning system (GPS) module, a microphone (MIC) module, a speaker module, a gyroscope module, etc. However, a kind of the function modules 540, 550, 560, and 570 included in the mobile device 500 is not limited thereto. Meanwhile, the memory device 520, the storage device 530, and the function modules 540, 550, 560, and 570 may be classified into controllable loads and uncontrollable loads according to operational characteristics thereof.

The power module 580 may provide the battery voltage to the application processor 510, the memory device 520, the storage device 530, and the function modules 540, 550, 560, and 570. Here, the power module 580 may include the battery 582 that supplies the battery voltage and the load current control device 584 that controls the load current based on the gradient of the battery voltage when performing the battery voltage control operation. In one example embodiment, the load current control device 584 may include a voltage comparison unit that decides whether or not to perform the battery voltage control operation by comparing the battery voltage with a threshold value, a gradient determination unit that determines whether the gradient of the battery voltage is a positive gradient or a negative gradient at an interval of a reference or, alternatively, predetermined control time when the voltage comparison unit decides to perform the battery voltage control operation, a load current control unit that controls the load current based on the gradient of the battery voltage at an interval of the reference or, alternatively, predetermined control time when the voltage comparison unit decides to perform the battery voltage control operation, and a timer unit that provides time information to the gradient determination unit at an interval of the reference or, alternatively, predetermined control time when the voltage comparison unit decides to perform the battery voltage control operation. For example, according to example embodiments of the inventive concepts, the load current control device 584 may include the structure and operation of the load current control device 100 described above with reference to FIG. 13. In another example embodiment, the load current control device 584 may include a voltage comparison unit that decides whether or not to perform the battery voltage control operation by comparing the battery voltage with a first threshold value and a second threshold value, where the first threshold value is different from the second threshold value, a gradient determination unit that determines whether the gradient of the battery voltage is the positive gradient or the negative gradient at an interval of the reference or, alternatively, predetermined control time when the voltage comparison unit decides to perform the battery voltage control operation, a load current control unit that controls the load current based on the gradient of the battery voltage at an interval of the reference or, alternatively, predetermined control time when the voltage comparison unit decides to perform the battery voltage control operation, and a timer unit that provides the time information to the gradient determination unit at an interval of the reference or, alternatively, predetermined control time when the voltage comparison unit decides to perform the battery voltage control operation. For example, according to example embodiments of the inventive concepts, the load current control device 584 may include the structure and operation of the load current control device 200 described above with reference to FIG. 17.

As described above, the load current control device 584 may perform the battery voltage control operation when the battery voltage becomes lower than the threshold value (or, the first threshold value), and may finish the battery voltage control operation when the battery voltage becomes higher than the threshold value (or, the second threshold value). In addition, at an interval of the reference or, alternatively, predetermined control time, the load current control device 584 may decrease the load current flowing through the loads by a reference or, alternatively, predetermined value when determining that the gradient of the battery voltage is the negative gradient, and may maintain the load current flowing through the loads when determining that the gradient of the battery voltage is the positive gradient. To determine whether the gradient of the battery voltage is the positive gradient or the negative gradient, the load current control device 584 may compare the battery voltage at a first time with the battery voltage at a second time, where the first time is the time when the reference or, alternatively, predetermined control time elapses after the first time. Here, the load current control device 584 may determine that the gradient of the battery voltage is the negative gradient if the battery voltage at the first time is greater than the battery voltage at the second time, and may determine that the gradient of the battery voltage is the positive gradient if the battery voltage at the first time is smaller than the battery voltage at the second time. Further, in some example embodiments of the inventive concepts, the load current control device 584 may increase the load current flowing through the loads when the load current control device 584 finishes the battery voltage control operation. In conclusion, the mobile device 500 may prevent an instantaneous, or relatively brief, sharp decrease of the battery voltage by using the load current control device 584 when the loads of the mobile device 500 instantaneously, or within a relatively short period of time, use the large load current. As a result, the mobile device 500 may achieve a high operational stability (or, reliability).

Figure 20:
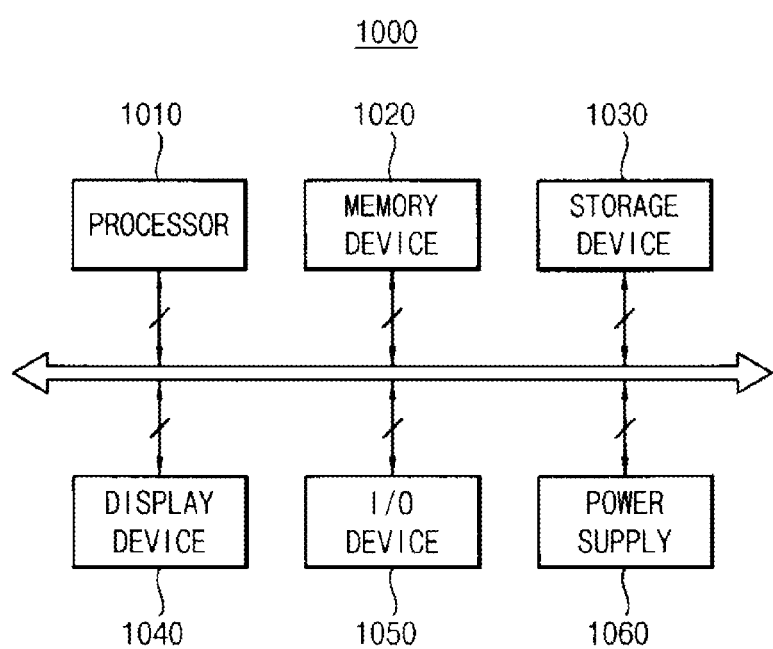
FIG. 20 is a block diagram illustrating an electronic device having a load current control device according to example embodiments of the inventive concepts.

FIG. 20 is a block diagram illustrating an electronic device having a load current control device according to example embodiments of the inventive concepts.

Referring to FIG. 20, the electronic device 1000 may include a processor 1010, a memory device 1020, a storage device 1030, a display device 1040, an input/output (I/O) device 1050, and a power supply 1060. In addition, the electronic device 1000 may further include a plurality of ports for communicating a video card, a sound card, a memory card, a universal serial bus (USB) device, other electronic devices, etc.

The processor 1010 may perform various computing functions. The processor 1010 may be a micro-processor, a central processing unit (CPU), etc. The processor 1010 may be coupled to other components (e.g., the memory device 1020, the storage device 1030, the display device 1040, the I/O device 1050, etc) via an address bus, a control bus, a data bus, etc. In some example embodiments of the inventive concepts, the processor 1010 may be coupled to an extended bus such as a peripheral component interconnection (PCI) bus. The memory device 1020 and the storage device 1030 may store data for operations of the electronic device 1000. For example, the memory device 1020 may correspond to a volatile semiconductor memory device such as a DRAM device, an SRAM device, a mobile DRAM, etc, and the storage device 1030 may correspond to a non-volatile semiconductor memory device such as an EPROM device, an EEPROM device, a flash memory device, a PRAM device, a RRAM device, an NFGM device, a PoRAM device, an MRAM device, an FRAM device, etc. In some example embodiments of the inventive concepts, the storage device 1030 may correspond to an SSD device, an HDD device, a CD-ROM device, etc.

The display device 1040 may display an image related to data used (or, processed) by the electronic device 1000. For example, the display device 1040 may be a liquid crystal display (LCD) device, an organic light emitting display (OLED) device, etc. The I/O device 1050 may include an input device such as a keyboard, a keypad, a touch-pad, a touch-screen, a mouse, etc, and an output device such as a speaker, a printer, etc. In some example embodiments of the inventive concepts, the display device 1040 may be included in the I/O device 1050. The power supply 1060 may provide a power for operations of the electronic device 1000. Here, the power supply 1060 may include a battery that supplies a battery voltage and a load current control device that controls a load current based on a gradient of the battery voltage when performing a battery voltage control operation. For example, according to example embodiments of the inventive concepts, the power supply 1060 may include the structure and operation of one of the load current control device 100 described above with reference to FIG. 13 and the load current control device 200 described above with reference to FIG. 17. As described above, the load current control device may prevent an instantaneous, or relatively brief, sharp decrease of the battery voltage by sensing the gradient of the battery voltage to control (i.e., decrease or maintain) the load current based on the gradient of the battery voltage when the battery voltage becomes lower than a reference or, alternatively, predetermined threshold value as a plurality of loads of the electronic device 1000 instantaneously, or within a relatively short period of time, use a large load current. As a result, the electronic device 1000 may achieve a high operational stability by using the load current control device.

The present inventive concept may be applied to a system that operates based on a battery. For example, the present inventive concept may be applied to a computer, a laptop, a digital camera, a cellular phone, a smart-phone, a smart-pad, a personal digital assistants (PDA), a portable multimedia player (PMP), an MP3 player, a navigation system, a camcorder, an electronic control unit (ECU) for vehicles, a portable game console.

The foregoing is illustrative of example embodiments of the inventive concepts and is not to be construed as limiting thereof. Although a few example embodiments of the inventive concepts have been described, those skilled in the art will readily appreciate that many modifications are possible in the example embodiments of the inventive concepts without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments of the inventive concepts and is not to be construed as limited to the specific example embodiments of the inventive concepts disclosed, and that modifications to the disclosed example embodiments of the inventive concepts, as well as other example embodiments of the inventive concepts, are intended to be included within the scope of the appended claims.

What is claimed is:

1. A method of controlling a load current, the method comprising:
   beginning a battery voltage control operation when a battery voltage becomes lower than a first threshold value, the battery voltage control operation including iteratively,
      determining whether a gradient of the battery voltage is a positive gradient or a negative gradient at an interval of a reference control time, and
      controlling the load current based on the gradient of the battery voltage at an interval of the reference control time; and
   finishing the battery voltage control operation by ending the determining and the controlling when the battery voltage becomes higher than a second threshold value.

2. The method of claim 1, wherein the first threshold value is equal to the second threshold value.

3. The method of claim 1, wherein the first threshold value is different from the second threshold value.

4. The method of claim 1, wherein determining whether a gradient of the battery voltage is a positive gradient or a negative gradient at an interval of a reference control time comprises:
   measuring the battery voltage at a first time;
   measuring the battery voltage at a second time, the first time being earlier than the second time by an amount of time equal to the reference control time;
   determining that the gradient of the battery voltage is the negative gradient when the battery voltage at the first time is greater than the battery voltage at the second time; and
   determining that the gradient of the battery voltage is the positive gradient when the battery voltage at the first time is smaller than the battery voltage at the second time.

5. The method of claim 4, wherein controlling the load current based on the gradient of the battery voltage at an interval of the reference control time comprises:
   decreasing the load current when the gradient of the battery voltage is determined to be the negative gradient; and
   maintaining the load current when the gradient of the battery voltage is determined to be the positive gradient.

6. The method of claim 1, further comprising:
   increasing the load current after the battery voltage control operation is finished.

7. The method of claim 6, wherein the load current is increased one time after the battery voltage control operation is finished.

8. The method of claim 6, wherein the load current is increased one or more times during a reference period of time after the battery voltage control operation is finished.

9. A load current control device comprising:
   a memory storing computer-readable instructions;
   one or more processors configured to execute the instructions to,
      decide whether or not to perform a battery voltage control operation by comparing a battery voltage with a threshold value;
      when the one or more processors decide to perform the battery voltage control operation, the processor performs the battery voltage control operation by iteratively,
         determining whether a gradient of the battery voltage is a positive gradient or a negative gradient at an interval of a reference control time,
         controlling a load current based on the gradient of the battery voltage at an interval of the reference control time, and
         providing time information at an interval of the reference control time; and
      end the battery voltage control operation by ending the determining and the controlling based on the battery voltage and the threshold value.

10. The device of claim 9, wherein the one or more processors are configured to decide to perform the battery voltage control operation when the battery voltage becomes lower than the threshold value, and
   wherein the one or more processors are configured to end the battery voltage control operation when the battery voltage becomes higher than the threshold value.

11. The device of claim 10, wherein the one or more processors are configured to measure the battery voltage at a first time, measures the battery voltage at a second time, the second time being the time when the reference control time elapses after the first time, and compares the battery voltage at the first time with the battery voltage at the second time, and
   wherein one or more processors are configured to determine that the gradient of the battery voltage is the negative gradient when the battery voltage at the first time is greater than the battery voltage at the second time, and configured to determine that the gradient of the battery voltage is the positive gradient when the battery voltage at the first time is smaller than the battery voltage at the second time.

12. The device of claim 11, wherein the one or more processors are configured to decrease the load current when the gradient of the battery voltage is determined to be the negative gradient, and configured to maintain the load current when the gradient of the battery voltage is determined to be the positive gradient.

13. The device of claim 12, wherein the one or more processors are configured to increase the load current after the battery voltage control operation is finished.

14. A load current control device comprising:
   a memory storing computer-readable instructions;

one or more processors configured to execute the instructions to,
  decide whether or not to perform a battery voltage control operation by comparing a battery voltage with a first threshold value and a second threshold value, the first threshold value being different from the second threshold value,
  when the one or more processors decide to perform the battery voltage control operation, the processor performs the battery voltage control operation by iteratively,
    determining whether a gradient of the battery voltage is a positive gradient or a negative gradient at an interval of a reference control time,
    controlling a load current based on the gradient of the battery voltage at an interval of the reference control time, and
    providing time information at an interval of the reference control time, and
  end the battery voltage control operation by ending the determining and the controlling based on the battery voltage and at least one of the first or second threshold.

15. The device of claim 14, wherein the one or more processors are configured to perform the battery voltage control operation when the battery voltage becomes lower than the first threshold value, and
  wherein the one or more processors are configured to end the battery voltage control operation when the battery voltage becomes higher than the second threshold value.

16. The device of claim 15, wherein the one or more processors are configured to measure the battery voltage at a first time, measure the battery voltage at a second time, the first time being earlier than the second time by an amount of time equal to the reference control time, and compare the battery voltage measured at the first time with the battery voltage measured at the second time, and
  wherein the one or more processors are configured to determine that the gradient of the battery voltage is the negative gradient when the battery voltage at the first time is greater than the battery voltage at the second time, and configured to determine that the gradient of the battery voltage is the positive gradient when the battery voltage at the first time is smaller than the battery voltage at the second time.

17. The device of claim 16, wherein the one or more processors are configured to decrease the load current when the gradient of the battery voltage is determined to be the negative gradient, and configured to maintain the load current when the gradient of the battery voltage is determined to be the positive gradient.

18. The device of claim 17, wherein the one or more processors are configured to increase the load current after the battery voltage control operation is finished.

19. A mobile device comprising:
  an application processor;
  at least one memory device;
  at least one storage device;
  at least one function module; and
  a power supply including a battery configured to supply the battery voltage, the power supply being configured to,
    provide a battery voltage to the application processor, the memory device, the storage device, and the function module,
    begin a battery voltage control operation in response to the battery voltage becoming lower than a first threshold value, the battery voltage control operation including iteratively,
      determining whether a gradient of the battery voltage is a positive gradient or a negative gradient at an interval of a reference control time, and
      controlling the load current based on the gradient of the battery voltage at an interval of the reference control time, and
    finish the battery voltage control operation by ending the determining and the controlling in response to the battery voltage becoming higher than a second threshold value.

20. The device of claim 19, wherein the power supply is configured such that the first and second threshold values are the same.

21. The device of claim 19, wherein the power supply is configured such that the first and second threshold values are different from each other, becomes higher than a second threshold value, the first threshold value being different from the second threshold value.

22. The device of claim 19, wherein at an interval of a reference control time, power supply is configured to decrease the load current by a reference value when the gradient of the battery voltage is determined to be a negative gradient, and configured to maintain the load current when the gradient of the battery voltage is determined to be a positive gradient.

23. The device of claim 22, wherein the power supply is configured to determine whether the gradient of the battery voltage is the positive gradient or the negative gradient by comparing the battery voltage at a first time with the battery voltage at a second time, the first time being earlier than the second time by an amount of time equal to the reference control time.

24. The device of claim 19, wherein the power supply is configured to increase the load current after the battery voltage control operation is finished.

25. A method of controlling a load current of a device including a battery, the method comprising:
  choosing, as a load current control mode of the device, one of a first load current control mode and a second load current control mode based on a battery voltage of the battery;
  determining whether a gradient of the battery voltage is positive or negative; and
  controlling the load current based on the chosen load current control mode of the device and the determined gradient of the battery voltage,
  the choosing one of a first load current mode and a second load current mode including,
    choosing the first load current control mode as the load current control mode of the device if the battery voltage falls below a first threshold, and
    choosing the second load current control mode as the load current control mode of the device if the determined battery voltage rises above a second threshold,
  wherein controlling the load current based on the chosen load current control mode of the device and the determined gradient of the battery voltage includes,
    if the chosen currently load current control mode of the device is the first load current control mode,
      maintaining the current load of the device if the gradient of the battery voltage is a positive, and
      decreasing the current load of the device if the gradient of the battery voltage is negative; and if the chosen currently load current control mode of the device is the second load current control mode,
maintaining the current load of the device if the gradient of the battery voltage is a negative, and
increasing the current load of the device if the gradient of the battery voltage is positive.

26. The method of claim 25, wherein the first threshold and the second threshold are the same.

27. The method of claim 25, wherein the first threshold and the second threshold are different.

28. A method of controlling a load current, the method comprising:
beginning a battery voltage control operation when a battery voltage becomes lower than a first threshold value, the battery voltage control operation;
determining whether a gradient of the battery voltage is a positive gradient or a negative gradient at an interval of a reference control time;
controlling the load current based on the gradient of the battery voltage at an interval of the reference control time; and
finishing the battery voltage control operation by ending the determining and the controlling when the battery voltage becomes higher than a second threshold value,
wherein controlling the load current based on the gradient of the battery voltage at an interval of the reference control time includes,
decreasing the load current when the gradient of the battery voltage is determined to be the negative gradient; and
maintaining the load current when the gradient of the battery voltage is determined to be the positive gradient.

29. The method of claim 28, wherein the first threshold value is equal to the second threshold value.

30. The method of claim 28, wherein the first threshold value is different from the second threshold value.

31. A load current control device comprising:
a memory storing computer-readable instructions;
one or more processors configured to execute the instructions to,
begin a battery voltage control operation when a battery voltage becomes lower than a first threshold value, the battery voltage control operation,
determine whether a gradient of the battery voltage is a positive gradient or a negative gradient at an interval of a reference control time;
control the load current based on the gradient of the battery voltage at an interval of the reference control time, and
finish the battery voltage control operation by ending the determining and the controlling when the battery voltage becomes higher than a second threshold value,
wherein the one or more processors are configured such that controlling the load current based on the gradient of the battery voltage at an interval of the reference control time includes,
decreasing the load current when the gradient of the battery voltage is determined to be the negative gradient; and
maintaining the load current when the gradient of the battery voltage is determined to be the positive gradient.

32. The device of claim 31, wherein the first threshold value is equal to the second threshold value.

33. The device of claim 31, wherein the first threshold value is different from the second threshold value.

* * * * *